(12) United States Patent
Choi

(10) Patent No.: US 11,402,870 B2
(45) Date of Patent: Aug. 2, 2022

(54) FOLDABLE DISPLAY DEVICE AND METHOD OF OPERATING THE SAME

(71) Applicant: Samsung Display Co., LTD., Yongin-si (KR)

(72) Inventor: Kyungmin Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/003,822

(22) Filed: Aug. 26, 2020

(65) Prior Publication Data
US 2021/0064086 A1 Mar. 4, 2021

(30) Foreign Application Priority Data
Aug. 27, 2019 (KR) .................. 10-2019-0104891

(51) Int. Cl.
*G06F 1/16* (2006.01)
*G09F 9/30* (2006.01)

(52) U.S. Cl.
CPC .......... *G06F 1/1618* (2013.01); *G06F 1/1652* (2013.01); *G06F 1/1681* (2013.01); *G09F 9/301* (2013.01)

(58) Field of Classification Search
CPC .... G06F 1/1618; G06F 1/1652; G06F 1/1681; G06F 1/1641; G09F 9/301; Y02E 10/549; H04M 1/0268; H04M 1/0216
See application file for complete search history.

(56) References Cited

U.S. PATENT DOCUMENTS

| | | | |
|---|---|---|---|
| 9,173,287 B1 * | 10/2015 | Kim | G06F 1/1616 |
| 9,348,450 B1 * | 5/2016 | Kim | G06F 1/1681 |
| 9,603,271 B2 * | 3/2017 | Lee | H05K 5/0226 |
| 9,857,832 B2 | 1/2018 | Kim et al. | |
| 10,028,395 B2 | 7/2018 | Chen et al. | |
| 10,043,421 B2 | 8/2018 | Koo et al. | |
| 10,067,536 B1 | 9/2018 | Watamura | |
| 10,185,367 B2 | 1/2019 | Kim | |
| 10,188,004 B2 | 1/2019 | Yeh et al. | |
| 10,215,332 B2 * | 2/2019 | Lee | G06F 1/1641 |
| 10,345,858 B2 | 7/2019 | Han et al. | |

(Continued)

FOREIGN PATENT DOCUMENTS

| | | |
|---|---|---|
| KR | 10-2016-0090471 | 8/2016 |
| KR | 10-2017-0026021 | 3/2017 |
| KR | 10-2018-0130635 | 12/2018 |

OTHER PUBLICATIONS

European Search Report dated Nov. 12, 2020, issue to European Patent No. 20178913.

*Primary Examiner* — Hung S. Bui
*Assistant Examiner* — Sagar Shrestha
(74) *Attorney, Agent, or Firm* — H.C. Park & Associates, PLC

(57) ABSTRACT

A foldable display device, includes a foldable display module including a first non-folding portion, a second non-folding portion, and a folding portion disposed between the first non-folding portion and the second non-folding portion; a first support member disposed on the first non-folding portion supporting the first non-folding portion; a second support member disposed on the second non-folding portion supporting the second non-folding portion; and a third member rotatably coupled to the first support member.

13 Claims, 15 Drawing Sheets

(56) References Cited

U.S. PATENT DOCUMENTS

| | | | |
|---|---|---|---|
| 10,905,020 B2* | 1/2021 | Jan | F16C 11/04 |
| 10,955,880 B2* | 3/2021 | Wang | G06F 1/1616 |
| 2012/0044620 A1* | 2/2012 | Song | G06F 1/1681 |
| | | | 361/679.01 |
| 2012/0120618 A1* | 5/2012 | Bohn | G06F 1/1618 |
| | | | 361/679.01 |
| 2012/0243207 A1 | 9/2012 | Wang et al. | |
| 2013/0010405 A1* | 1/2013 | Rothkopf | H05K 5/0226 |
| | | | 361/679.01 |
| 2013/0021762 A1* | 1/2013 | van Dijk | H04M 1/022 |
| | | | 361/749 |
| 2015/0233162 A1* | 8/2015 | Lee | G06F 1/1626 |
| | | | 16/223 |
| 2015/0330614 A1* | 11/2015 | Lee | B65D 85/38 |
| | | | 362/97.1 |
| 2016/0085265 A1* | 3/2016 | Park | G06F 1/1616 |
| | | | 361/807 |
| 2016/0135324 A1* | 5/2016 | Lee | G06F 1/1652 |
| | | | 248/346.01 |
| 2016/0150657 A1 | 5/2016 | Myeong et al. | |
| 2016/0227645 A1* | 8/2016 | Hampton | G06F 1/1616 |
| 2017/0192460 A1* | 7/2017 | Watanabe | G09F 9/00 |
| 2017/0227994 A1 | 8/2017 | Hsu | |
| 2018/0217639 A1 | 8/2018 | Jones et al. | |
| 2018/0242466 A1 | 8/2018 | Lee et al. | |
| 2019/0082544 A1* | 3/2019 | Park | G09F 9/301 |
| 2019/0200470 A1* | 6/2019 | Woo | G06F 1/1681 |
| 2020/0166974 A1* | 5/2020 | Ai | G06F 1/1641 |
| 2020/0201400 A1* | 6/2020 | Jan | G06F 1/1652 |

\* cited by examiner

FOLDABLE DISPLAY DEVICE AND METHOD OF OPERATING THE SAME

CROSS-REFERENCE TO RELATED APPLICATION(S)

This application claims priority from and the benefit of Korean Patent Application No. 10-2019-0104891, filed on Aug. 27, 2019, which is hereby incorporated by reference for all purposes as if fully set forth herein.

BACKGROUND

Field

Exemplary implementations of the invention relate generally to a display device and, more specifically, to a foldable display device.

Discussion of the Background

A display device may display images to provide information to users. Recently, a flexible display device that can be deformed into various shapes has been developed. Unlike a flat display device, the flexible display device may be foldable, rollable or bendable like a piece of paper. The flexible display device may be easily portable, and may improve convenience of users.

The above information disclosed in this Background section is only for understanding of the background of the inventive concepts, and, therefore, it may contain information that does not constitute prior art.

SUMMARY

Applicant realized that undesired deformations due to restoring forces can occur in the flexible portion of a foldable display device. Foldable display devices constructed according to the principles and exemplary implementations of the invention, and methods of operating the same, are capable of preventing a foldable display module from being deformed into undesirable configurations. For example, a plate can rotatably support the display surface of the display device in various folded and unfolded configurations to prevent the deformation of a folded portion in certain configurations.

Additional features of the inventive concepts will be set forth in the description which follows, and in part will be apparent from the description, or may be learned by practice of the inventive concepts.

According to one aspect of the invention, a foldable display device, includes: a foldable display module including a first non-folding portion, a second non-folding portion, and a folding portion disposed between the first non-folding portion and the second non-folding portion; a first support member disposed on the first non-folding portion supporting the first non-folding portion; a second support member disposed on the second non-folding portion supporting the second non-folding portion; and a third member rotatably coupled to the first support member.

The first support member may include a first plate, the second support member may include a second plate, the third member may include a first rotatable plate, and in an un-folded mode in which the folding portion is not folded, the first rotatable plate may be generally parallel to the first plate.

In the un-folded mode, the first rotatable plate may support the folding portion.

The first support member may include a first plate, the second support member may include a second plate, the third member may include a first rotatable plate, and, in an out-folded mode when the folding portion is folded such that a non-display surface of the first non-folding portion and a non-display surface of the second non-folding portion face each other, the first rotatable plate may not generally be parallel to the first plate.

In the out-folded mode, the first rotatable plate may be generally perpendicular to the first plate.

In the out-folded mode, the first rotatable plate may not support a substantial portion of the folding portion.

The first support member may include a first plate, the second support member may include a second plate, the third member may include a first rotatable plate, and, in an inwardly folded mode when the folding portion is folded such that a display surface of the first non-folding portion and a display surface of the second non-folding portion face each other, the first rotatable plate may be generally parallel to the first plate.

In the inwardly folded mode, the first rotatable plate may support a substantial portion of the folding portion.

The folding portion may include a first region adjacent to the first non-folding portion and a second region adjacent to the second non-folding portion, and, in the inwardly folded mode, the first region may not be folded and the second region may be folded.

The first regions may include the substantial portion of the folding portion, and in the inwardly folded mode, the first rotatable plate may support the first region of the folding portion.

The foldable display module may be foldable in an out-folded mode when the folding portion is folded around a first folding axis such that a non-display surface of the first non-folding portion and a non-display surface of the second non-folding portion face each other and in an inwardly folded mode when the folding portion is folded around a second folding axis such that a display surface of the first non-folding portion and a display surface of the second non-folding portion may face each other.

A radius of curvature of the folding portion in the inwardly folded mode may be less than a radius of curvature of the folding portion in the out-folded mode.

The shortest distance from the first folding axis to the first non-folding portion may be substantially the same as the shortest distance from the first folding axis to the second non-folding portion.

The shortest distance from the second folding axis to the first non-folding portion may be greater than the shortest distance from the second folding axis to the second non-folding portion.

The third member may be coupled to the first support member through a gear portion.

A fourth member may be rotatably connected to the second support member.

In an un-folded mode when the folding portion is not folded, the third member may be generally parallel to the first support member, and the fourth member may be generally parallel to the second support member.

In the un-folded mode, the third member and the fourth member may support the folding portion.

In an out-folded mode when the folding portion is folded such that a non-display surface of the first non-folding portion and a non-display surface of the second non-folding portion face each other, the third member may be not generally parallel to the first support member, and the fourth member may be not generally parallel to the second support member.

In the out-folded mode, the first support member may be generally perpendicular to the first support member, and the second support member may be generally perpendicular to the second support member.

In the out-folded mode, the third member and the fourth member may not substantially support the folding portion.

In an inwardly folded mode when the folding portion is folded such that a display surface of the first non-folding portion and a display surface of the second non-folding portion face each other, the third member may be generally parallel to the first support member, and the fourth member may be generally parallel to the second support member.

The folding portion may include a first region adjacent to the first non-folding portion, a second region adjacent to the second non-folding portion, and a third region between the first region and the second region, and wherein, in the inwardly folded mode, the first region and the second region may be not folded and the third region may be folded.

In the inwardly folded mode, the third member may support the first region of the folding portion, and the fourth member may support the second region of the folding portion.

The foldable display module may be foldable in an out-folded mode when the folding portion is folded around a first folding axis such that a non-display surface of the first non-folding portion and a non-display surface of the second non-folding portion may face each other and in an inwardly folded mode when the folding portion is folded around a second folding axis such that a display surface of the first non-folding portion and a display surface of the second non-folding portion may face each other.

The shortest distance from the first folding axis to the first non-folding portion may be substantially the same as the shortest distance from the first folding axis to the second non-folding portion. The shortest distance from the second folding axis to the first non-folding portion may be substantially the same as the shortest distance from the second folding axis to the second non-folding portion.

The third member may include a first rotatable plate connected to the first support member through a first gear portion, and the fourth member may include a second rotatable plate connected to the second support member through a second gear portion.

According to another aspect of the invention, a method of operating a foldable display device having a foldable display module including a first non-folding portion, a second non-folding portion and a folding portion between the first non-folding portion and the second non-folding portion, a first support member supporting the first non-folding portion, a second support member supporting the second non-folding portion, and a third member rotatably connected to at least one of the first support member and the second support member, the method includes the steps of: folding the foldable display module; and rotating the third member.

The step of folding the foldable display module by rotating the third member to outwardly fold the folding portion such that a non-display surface of the first non-folding portion and a non-display surface of the second non-folding portion may face each other.

The step of folding the foldable display module by rotating the third member to inwardly folding the folding portion such that a display surface of the first non-folding portion and a display surface of the second non-folding portion may face each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
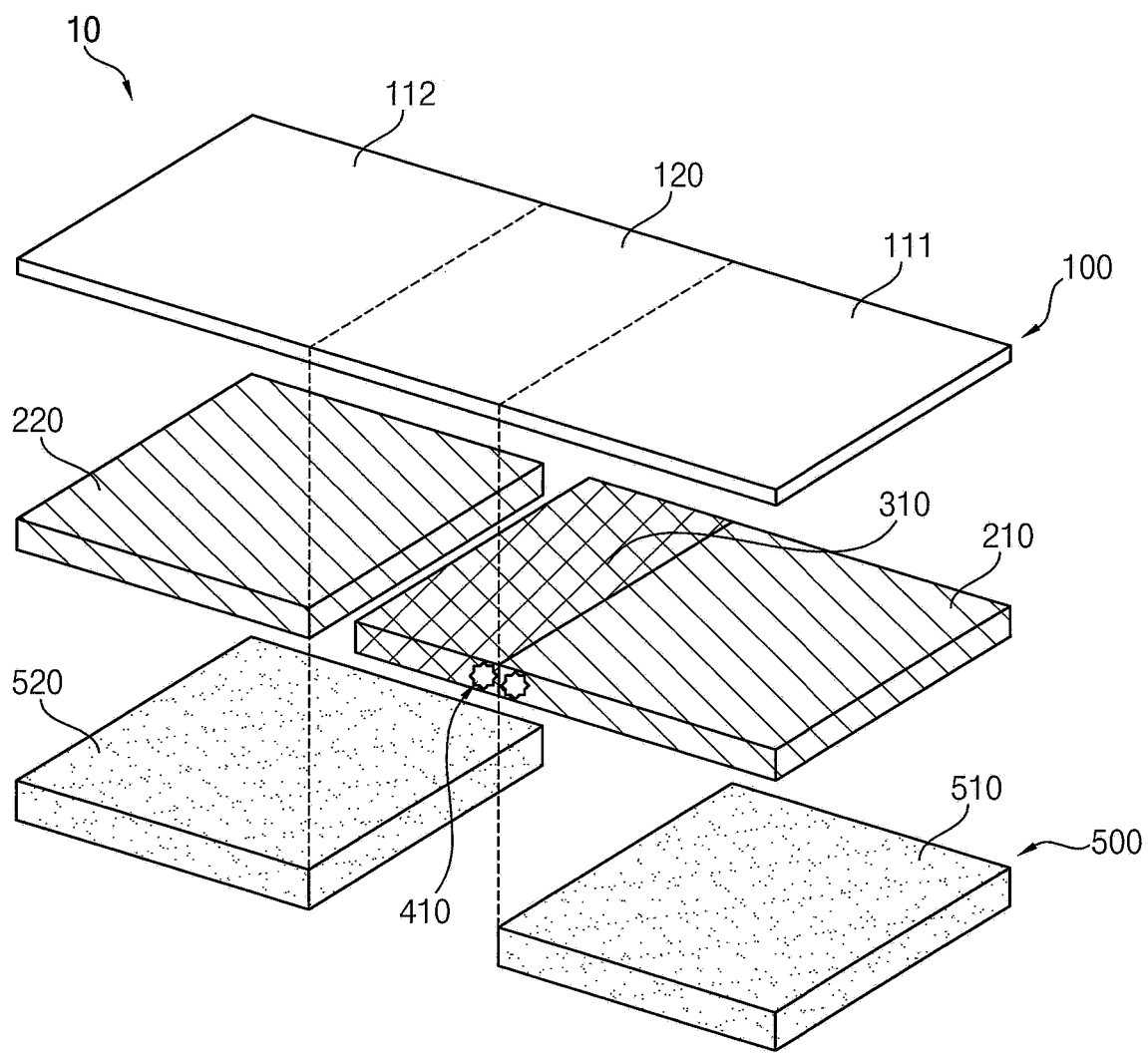
FIG. 1 is an exploded perspective view illustrating an exemplary embodiment of a foldable display device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
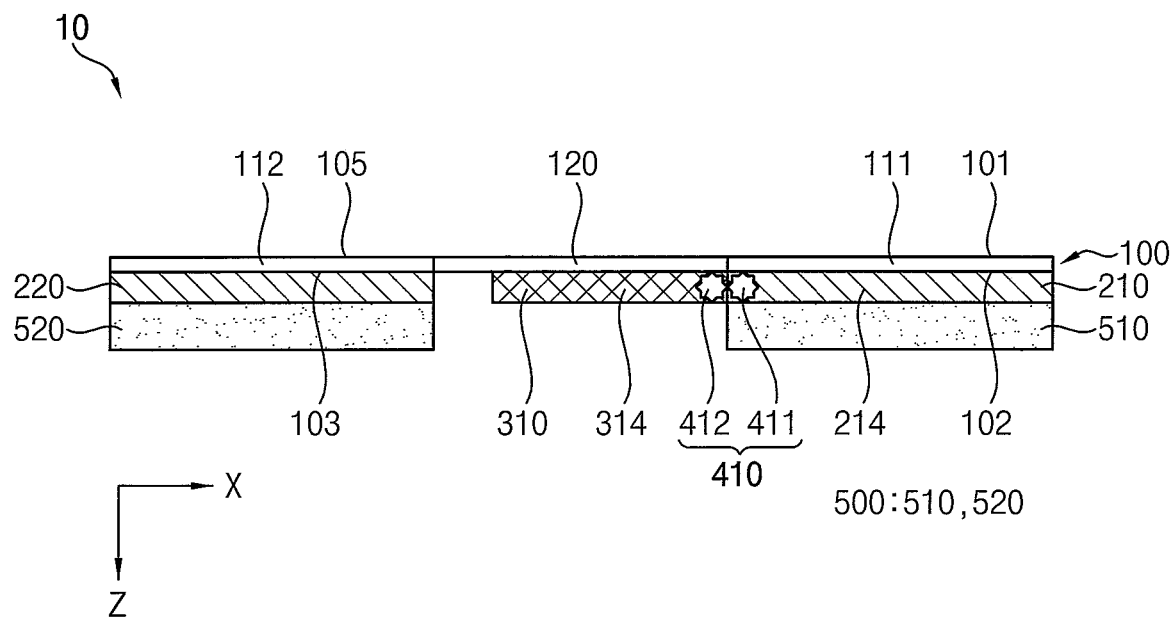
FIG. 2 is a cross-sectional view illustrating the foldable display device of FIG. 1 in an unfolded position.
Figure 3:
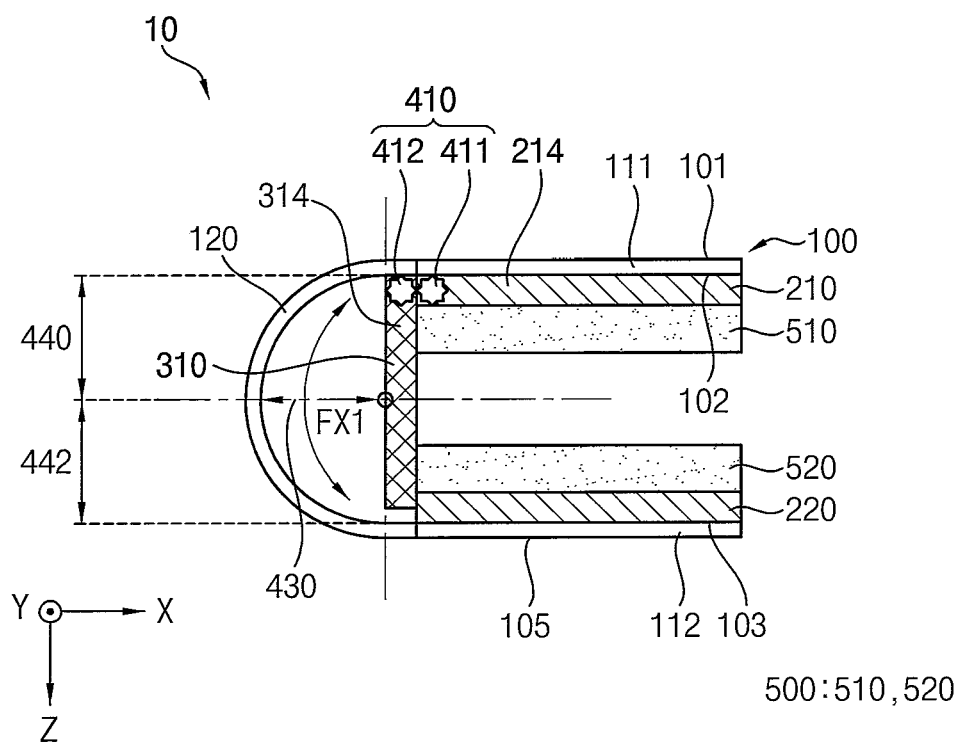
FIG. 3 is a cross-sectional view illustrating the foldable display device of FIG. 1 in an outwardly folded position.
Figure 4:
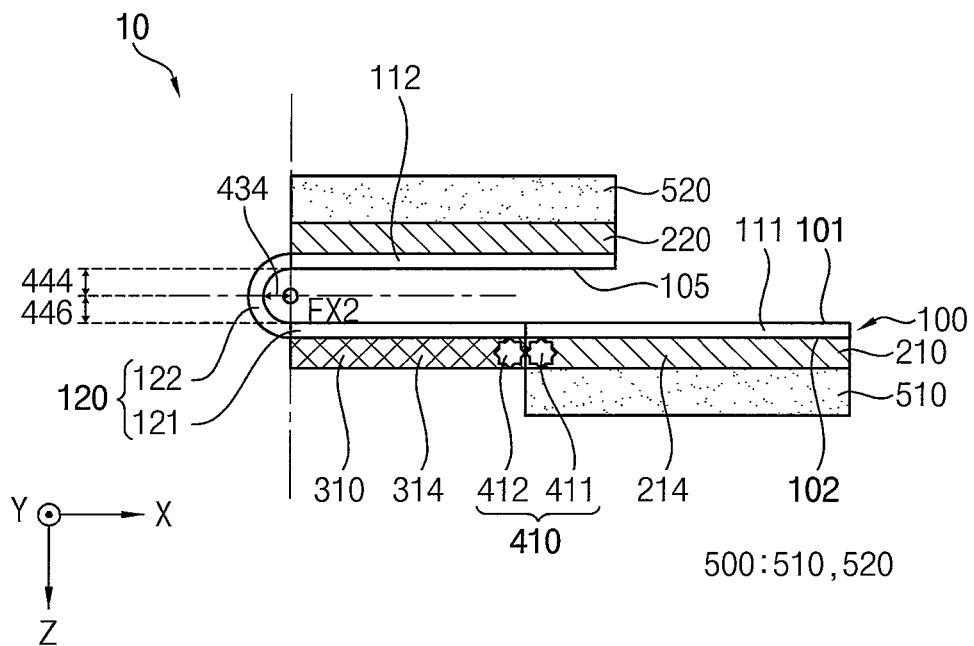
FIG. 4 is a cross-sectional view illustrating the foldable display device of FIG. 1 in an inwardly folded position.

FIG. 1 is an exploded perspective view illustrating an exemplary embodiment of a foldable display device constructed according to principles of the invention. FIG. 2 is a cross-sectional view illustrating the foldable display device of FIG. 1 in an unfolded position. FIG. 3 is a cross-sectional view illustrating the foldable display device of FIG. 1 in an outwardly folded position. FIG. 4 is a cross-sectional view illustrating the foldable display device of FIG. 1 in an inwardly folded position.

Referring to FIGS. 1, 2, 3 and 4, a flexible or foldable display device 10 according to an exemplary embodiment may include a foldable display module 100, a first support member, which may be in the form of a plate 210, a second support member, which may be in the form of a plate 220, a third member, which may be in the form of a rotating plate 310, a first gear portion 410, and a jig 500.

The foldable display module 100 may include a first non-folding portion 111, a second non-folding portion 112, and a folding portion 120. The folding portion 120 may be disposed between the first non-folding portion 111 and the second non-folding portion 112. The first non-folding portion 111 and the second non-folding portion 112 may be spaced apart from each other with the folding portion 120 therebetween. The first non-folding portion 111 and the second non-folding portion 112 may be substantially flat, unfolded portions in the foldable display module 100. The folding portion 120 may be the portion that can bent, folded, and/or displaced relative to the other portions of the foldable display module 100.

The foldable display module 100 may have a display surface 101 and a non-display surface 102. The foldable display module 100 may display an image toward the display surface 101. The non-display surface 102 may be opposite to the display surface 101.

The first plate 210 may be disposed on the first non-folding portion 111 of the foldable display module 100 and support the first non-folding portion 111. The first plate 210 may be disposed on the non-display surface 102 of the first non-folding portion 111. In an exemplary embodiment, an adhesive layer may be interposed between the first non-folding portion 111 of the foldable display module 100 and the first plate 210 so that the first plate 210 may be attached on the non-display surface 102 of the first non-folding portion 111. For example, the adhesive layer may be an optically clear adhesive (OCA), a pressure sensitive adhesive (PSA), or the like.

The first plate 210 may have the shape generally the same as that of the first non-folding portion 111 of the foldable display module 100 in a plan view, and may substantially overlap the first non-folding portion 111. For example, the area of the first plate 210 may be substantially equal to that of the first non-folding portion 111. The first plate 210 may include any material capable of rigidly supporting the non-folding portion 111, such as metal, plastic, or the like. For example, the metal may include at least one alloy or any combination thereof that may be generically known as 64FeNi and sold under the trade designation INVAR® by Aperam Alloys Imphy Joint Stock Company, of Imphy, France, an iron based nobinite alloy, or a stainless steel alloy.

The second plate 220 may be disposed on the second non-folding portion 112 of the foldable display module 100 and support the second non-folding portion 112. The second plate 220 may be disposed on the non-display surface 102 of the second non-folding portion 112. In an exemplary embodiment, an adhesive layer may be interposed between the second non-folding portion 112 of the foldable display module 100 and the second plate 220 so that the second plate 220 may be attached on a non-display surface 103, which may be the same or similar to the non-display surface 102, of the second non-folding portion 112. For example, the adhesive layer may be an optically clear adhesive, a pressure sensitive adhesive, or the like.

The second plate 220 may have substantially the shape the same as that of the second non-folding portion 112 of the foldable display module 100 in a plan view, and may substantially overlap the second non-folding portion 112. For example, the area of the second plate 220 may be substantially equal to that of the second non-folding portion 112. The second plate 220 may include any material capable of rigidly supporting the non-folding portion 112, such as metal, plastic, or the like. For example, the metal may be, independently, an alloy as described above for the first plate 210. In the illustrated exemplary embodiment, the second plate 220 may include a material substantially the same as that of the first plate 210.

Figure 10:
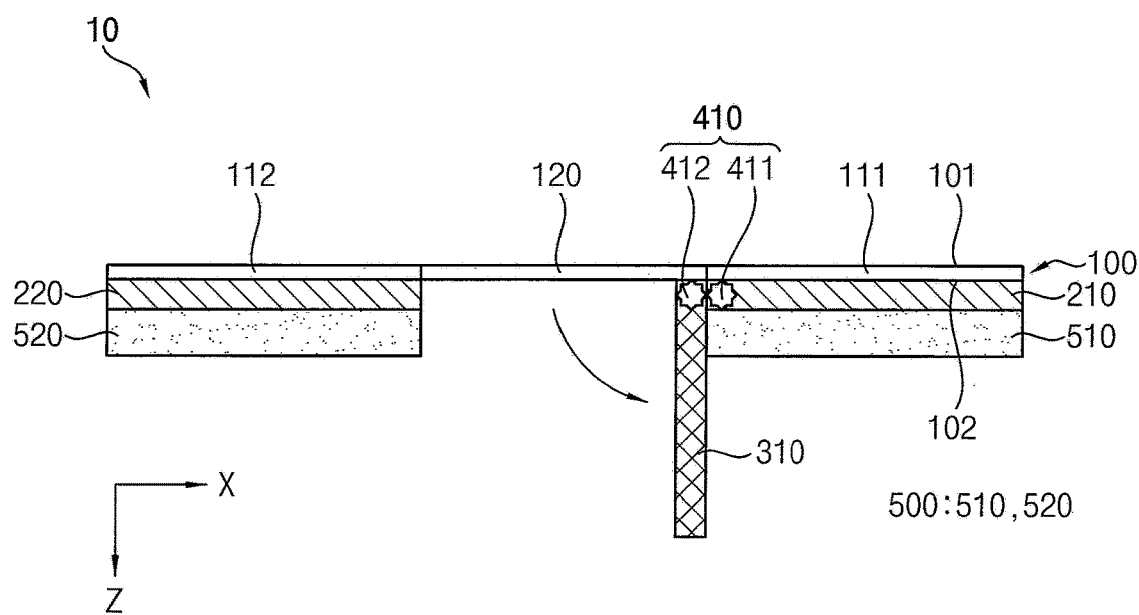
FIG. 10 is a cross-sectional view illustrating an exemplary embodiment of a method of outwardly folding the unfolded foldable display device of FIG. 2.

The first rotating plate 310 may be rotatably connected to the first plate 210. The first rotating plate 310 may be rotatably connected to the first plate 210 through the first gear portion 410. The first gear portion 410 may include a first gear 411 and a second gear 412. The first gear 411 may be rotatably supported in and disposed on the side 214 of the first plate 210, and the second gear 412 may be fixedly supported in and disposed on the side 314 of the first rotating plate 310. The first gear 411 and the second gear 412 may be engaged with each other for supporting the first rotating plate 310 for rotation relative to the first plate 210, and the direction of rotation of the first gear 411 and the direction of rotation of the second gear 412 may be opposite to each other, e.g., one may be clockwise and the other counterclockwise. The first rotating plate 310 may be rotated with respect to the first plate 210 by the rotation of the first gear 411 and the second gear 412 by a user moving the first rotating plate 310, e.g., counter-clockwise as shown in FIG. 10.

The area of the first rotating plate 310 may be less than the area of the folding portion 120. For example, the width of the first rotating plate 310 in an X-axis direction may be less than the width of the folding portion 120 in the X-axis direction. The first rotating plate 310 may include metal, plastic, or the like. For example, the metal may be, independently, an alloy as described above for the first plate 210. In an exemplary embodiment, the first rotating plate 310 may include a material substantially the same as those of the first plate 210 and/or the second plate 220.

The jig 500 may be disposed on the first plate 210 and the second plate 220. The jig 500 may be disposed on the foldable display module 100 with the first plate 210 and the second plate 220 therebetween. In other words, the first plate 210 and the second plate 220 may be disposed between the foldable display module 100 and the jig 500. The jig 500 may support the foldable display module 100, the first plate 210, and the second plate 220.

The jig 500 may include a first jig 510 and a second jig 520. The first jig 510 may be disposed on the first plate 210, and the second jig 520 may be disposed on the second plate 220. In the illustrated embodiment, the jig 500 may include a hinge portion disposed between the first jig 510 and the second jig 520. The first jig 510 and the second jig 520 may be rotatably connected to each other through the hinge portion.

As illustrated in FIG. 2, the foldable display module 100 may be unfolded. In the illustrated exemplary embodiment, the folding portion 120 of the foldable display module 100 may not be folded, and the display surface 101 of the first non-folding portion 111 and the display surface 105 of the second non-folding portion 112 of the foldable display module 100 may face the same direction, for example, a Z-axis direction. Hereinafter, a state in which the foldable display module 100 is unfolded is referred as an un-folded mode.

In the un-folded mode, the first rotating plate 310 may be disposed on the folding portion 120 and support the folding portion 120. In this case, the first rotating plate 310 may be disposed on the non-display surface 102 of the folding portion 120.

As illustrated in FIG. 3, the foldable display module 100 may be outwardly folded with respect to a first folding axis FX1. In the illustrated exemplary embodiment, the folding portion 120 of the foldable display module 100 may be folded such that the non-display surface 102 of the first non-folding portion 111 and the non-display surface 103 of the second non-folding portion 112 of the foldable display module 100 may face each other. For example, the display surface 101 of the first non-folding portion 111 and the display surface 105 of the second non-folding portion 112 may face the outside of the foldable display device 10. Hereinafter, the position in which the foldable display module 100 is outwardly folded is referred as an out-folded mode.

In the out-folded mode, the folding portion 120 may be folded with having a first radius of curvature 430. For example, the first radius of curvature 430 may be about 7 mm or more. In the out-folded mode, the folding portion 120 may be folded with a relatively large curvature in consideration of the thickness of the first plate 210, the thickness of the second plate 220, the thickness of the first jig 510, and the thickness of the second jig 520.

In the out-folded mode, the folding portion 120 may be symmetrically folded with respect to the first folding axis FX1 in a Y-axis direction. In other words, in the out-folded mode, the folding portion 120 may be folded such that the first non-folding portion 111 and the second non-folding portion 112 are symmetrically located with respect to the first folding axis FX1. For example, the shortest distance 440 from the first folding axis FX1 to the first non-folding portion 111 may be generally equal to the shortest distance 442 from the first folding axis FX1 to the second non-folding portion 112. A distance in the X-axis direction from the first folding axis FX1 to the first non-folding portion 111 may be generally equal to a distance in the X-axis direction from the first folding axis FX1 to the second non-folding portion 112, and a distance 440 in the Z-axis direction from the first folding axis FX1 to the first non-folding portion 111 may be generally equal to a distance 442 in the Z-axis direction from the first folding axis FX1 to the second non-folding portion 112.

In the out-folded mode, the first rotating plate 310 may not be parallel to the first plate 210. In this case, the first rotating plate 310 may not fully support the folding portion 120. In the illustrated exemplary embodiment, the first rotating plate 310 may be generally perpendicular to the first plate 210. For example, the first plate 210 may extend along the X-axis direction, and the first rotating plate 310 may extend along the Z-axis direction, in which case the rotating plate 310 does not support a substantial portion of the folding portion 120.

As illustrated in FIG. 4, the foldable display module 100 may be in-folded with respect to a second folding axis FX2. In the illustrated exemplary embodiment, the folding portion 120 of the foldable display module 100 may be folded such that the display surface 101 of the first non-folding portion 111 and the display surface 105 of the second non-folding portion 112 of the foldable display module 100 may face each other. For example, the display surface 101 of the first non-folding portion 111 and the display surface 105 of the second non-folding portion 112 may face the inside of the foldable display device 10. Hereinafter, the position in which the foldable display module 100 is in-folded is referred as an in-folded mode.

In the in-folded mode, the folding portion 120 may be folded with having a second radius of curvature 434. For example, the second radius of curvature 434 may be about 2 mm or less. In the in-folded mode, the folding portion 120 may be folded with a relatively small curvature. Accordingly, the radius of curvature 434 of the folding portion 120 in the in-folded mode may be less than the radius of curvature 430 of the folding portion 120 in the out-folded mode. In other words, the second radius of curvature 434 of the folding portion 120 may be less than the first radius of curvature 430 of the folding portion 120.

The folding portion 120 may include a first region 121 adjacent to the first non-folding portion 111 and a second region 122 adjacent to the second non-folding portion 112. As described above, because the radius of curvature 434 of the folding portion 120 in the in-folded mode is less than the radius of curvature 430 of the folding portion 120 in the out-folded mode, the folding portion 120 may include an unfolded region and a folded region in the in-folded mode. In the illustrated exemplary embodiment, the first region 121 of the folding portion 120 may not be folded, and the second region 122 of the folding portion 120 may be folded. In this case, the first region 121 may be substantially planar.

In the in-folded mode, the folding portion 120 may be asymmetrically folded with respect to the second folding axis FX2 in a Y-axis direction. In other words, in the in-folded mode, the folding portion 120 may be folded such that the first non-folding portion 111 and the second non-folding portion 112 are asymmetrically located with respect to the second folding axis FX2. For example, the shortest distance 446 from the second folding axis FX2 to the first non-folding portion 111 may be greater than the shortest distance 444 from the second folding axis FX2 to the second non-folding portion 112. The distance in the X-axis direction from the second folding axis FX2 to the first non-folding portion 111 may be greater than the distance in the X-axis direction from the second folding axis FX2 to the second non-folding portion 112, and the distance 446 in the Z-axis direction from the second folding axis FX2 to the first non-folding portion 111 may be substantially equal to a distance 444 in the Z-axis direction from the second folding axis FX2 to the second non-folding portion 112. In the in-folded mode, the folding portion 120 may be asymmetrically folded due to the fact that the first region 121 of the folding portion 120 is not folded and only the second region 122 of the folding portion 120 is folded.

In the in-folded mode, the first rotating plate 310 may be substantially parallel to the first plate 210. The first rotating plate 310 may be disposed underneath a part of the folding portion 120, and support the part of the folding portion 120. In this case, the first rotating plate 310 may be disposed on the non-display surface 102 of the part of the folding portion 120. For example, the first rotating plate 310 may be disposed on the first region 121 of the folding portion 120 and support the first region 121 of the folding portion 120. In other words, the first rotating plate 310 may be disposed on an unfolded part of the folding portion 120 and support the unfolded part in the in-folded mode.

Figure 5:
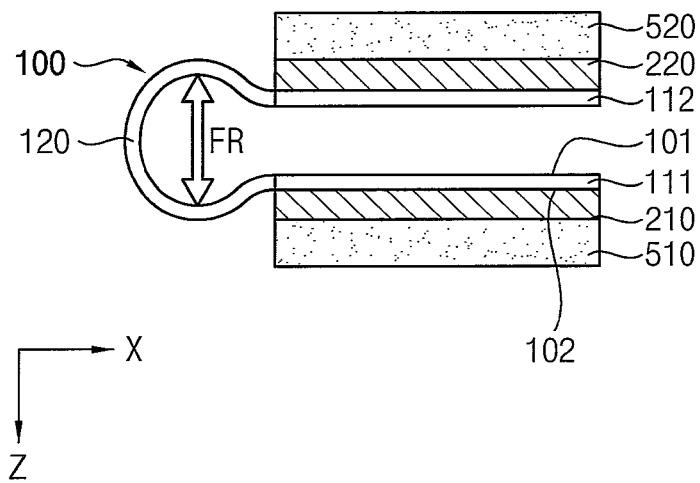
FIG. 5 is a cross-sectional view illustrating a comparative embodiment of a foldable display device in an inwardly folded position.

FIG. 5 is a cross-sectional view illustrating a comparative embodiment of a foldable display device in an inwardly folded position. Referring to FIG. 5, a foldable display device according to a comparative example may not include a rotating plate. When the foldable display device according to the comparative example is in-folded, parts of the folding portion 120 that are respectively adjacent to the first non-folding portion 111 and the second non-folding portion 112 may not be folded, and only a part of the folding portion 120 that is spaced apart from the first non-folding portion 111 and the second non-folding portion 112 may be folded ideally. However, in the in-folded mode, the folding portion 120 may have a relatively small radius of curvature, and a restoring force FR may be applied to the folding portion 120 in the Z-axis direction and the Z-axis direction in response to the inward folding of the folding portion 120. Accordingly, the shape of the folding portion 120 may be deformed and a foldable display module 100 may have an undesirable dumbbell shape.

As described above, the foldable display device 10 according to the illustrated exemplary embodiment may include the first rotating plate 310 rotatably connected to the first plate 210. When the foldable display device 10 according to the illustrated exemplary embodiment is in-folded, the first region 121 in the folding portion 120 adjacent to the first non-folding portion 111 may not be folded, and only the second region 122 in the folding portion 120 adjacent to the second non-folding portion 112 may be folded. Although restoring force is applied to the folding portion 120 in the Z-axis direction and the Z-axis direction in response to the inward folding of the folding portion 120, the first rotating plate 310 may support the first region 121 of the folding portion 120. Accordingly, the shape of the folding portion 120 may be maintained, and undesirable deformation of the foldable portion 120 due to the inwardly folding may be reduced or prevented.

Figure 6:
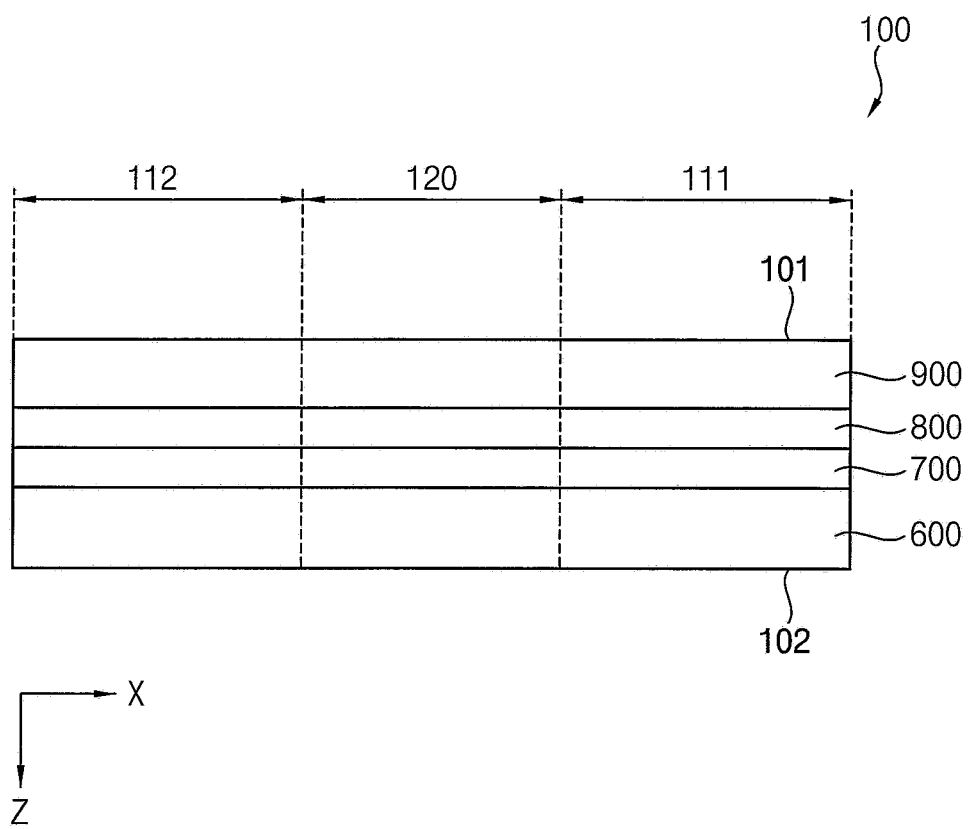
FIG. 6 is a cross-sectional view illustrating an exemplary embodiment of the foldable display module of the foldable display device of FIG. 1.

FIG. 6 is a cross-sectional view illustrating an exemplary embodiment of the foldable display module of the foldable display device of FIG. 1.

Referring to FIG. 6, the foldable display module 100 may include a display panel 600, a sensing layer 700, a polarizing layer 800, and a window 900. As described above, because the foldable display module 100 may be outwardly folded or inwardly folded according to the folding of the folding portion 120, the display panel 600, the sensing layer 700, the polarizing layer 800, and the window 900 may have flexible characteristics.

The display panel 600 may include a plurality of pixels, and may generate an image formed by light emitted from each of the pixels. The display panel 600 may include a first surface and a second surface opposite to each other. For example, the first surface of the display panel 600 may be toward the Z-axis direction, and the second surface of the display panel 600 may be toward the Z-axis direction. The display panel 600 may display an image to the first surface, and the second surface of the display panel 600 may be the non-display surface 102 of the foldable display module 100.

The sensing layer 700 may be disposed on the display panel 600. The sensing layer 700 may sense an external input such as an external object contacting or approaching the sensing layer 700. For example, the sensing layer 700 may sense the external input with a static capacitive method.

The polarizing layer 800 may be disposed on the sensing layer 700. The polarizing layer 800 may reduce reflection of external light. For example, when the external light having passed through the polarizing layer 800 is reflected from below the polarizing layer 800 (e.g., the display panel 600) and then passes through the polarizing layer 800 again, the phase of the reflected external light may be changed as the incoming external light passes through the polarizing layer 800 twice. As a result, the phase of reflected external light may be different from the phase of the incoming external light entering the polarizing layer 800 to the extent that a destructive interference occurs. Accordingly, the reflection of external light may be reduced to increase visibility.

The window 900 may be disposed on the polarizing layer 800. The window 900 may protect the display panel 600, the sensing layer 700, and the polarizing layer 800 from external impact, and may provide the display surface 101 of the foldable display module 100. In an exemplary embodiment, the window 900 may include glass, a polymer resin such as at least one of polycarbonate (PC), polymethyl methacrylate (PMMA), polyarylate (PAR), polyethersulfone (PES), polyethylene terephthalate (PET), polyethylene naphthalate (PEN), etc., or the like.

Figure 7:
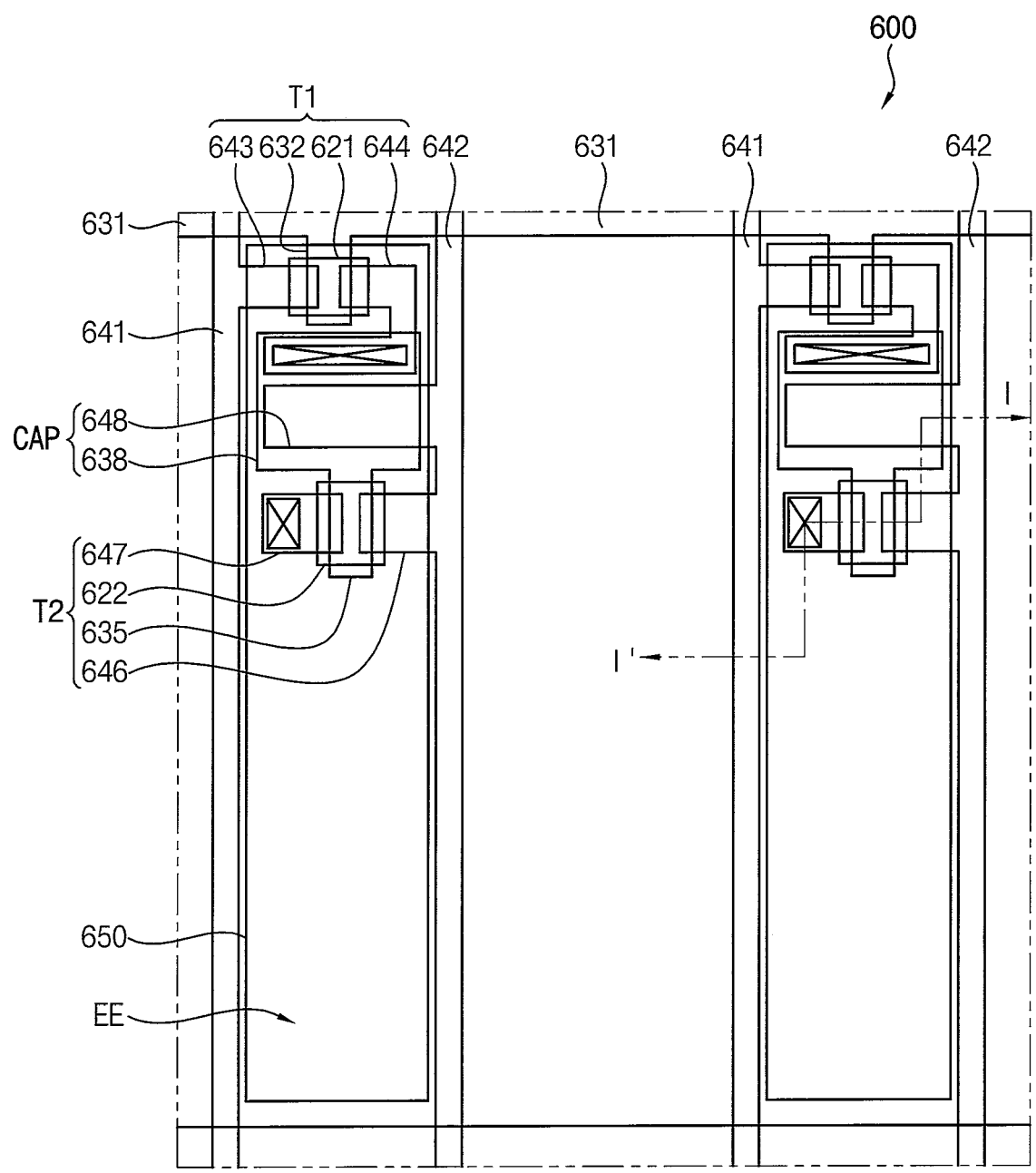
FIG. 7 is a plan view illustrating an exemplary embodiment of a display panel of the foldable display module of FIG. 6.
Figure 8:
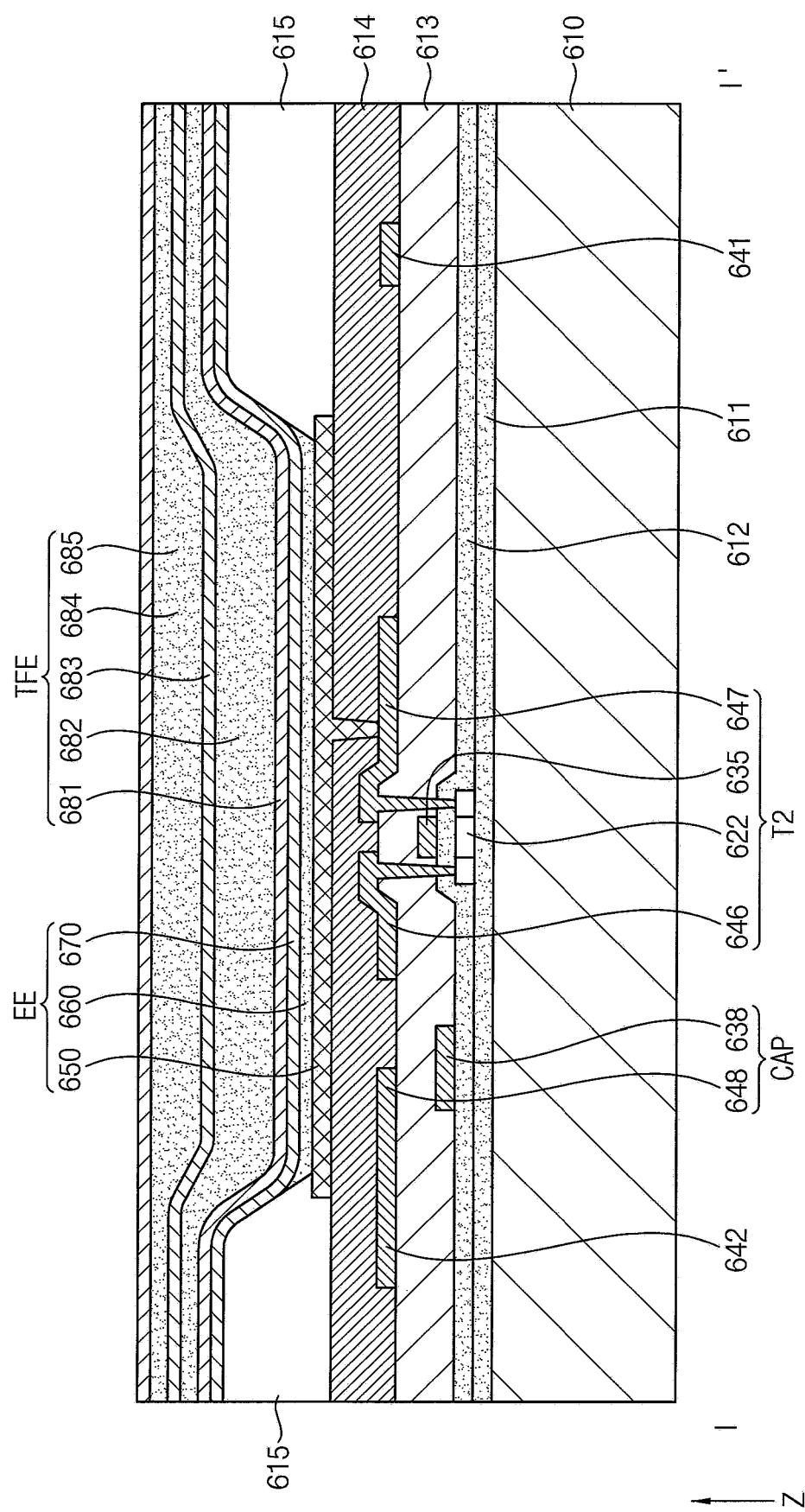
FIG. 8 is a cross-sectional view taken along line I-I' of FIG. 7.

FIG. 7 is a plan view illustrating an exemplary embodiment of a display panel of the foldable display module of FIG. 6. FIG. 8 is a cross-sectional view taken along line I-I' of FIG. 7. Referring to FIGS. 7 and 8, the display panel 600 includes a plurality of pixels, each of the pixels including a switching thin film transistor (TFT) T1, a driving TFT T2, a capacitor CAP, and a light emitting element EE. As used herein, the term "pixel" refers to a smallest unit for displaying an image, and the display panel 600 may display an image using the plurality of pixels.

Although FIGS. 7 and 8 illustrate each of the pixels including two TFTs and one capacitor, the exemplary embodiments are not limited thereto. In another exemplary embodiment, each of the pixels may include three or more TFTs and two or more capacitors.

The display panel 600 may include a substrate 610, a gate line 631 on the substrate 610, a data line 641 and a common power line 642 insulated from and intersecting the gate line 631. In general, each of the pixels may be defined by the gate line 631, the data line 641, and the common power line 642 as the boundary, however, the definition of the pixel is not limited thereto. The pixels may be defined by a pixel defining layer or a black matrix.

The substrate 610 may include a flexible material such as plastic or the like. For example, the substrate 610 may include at least one of polyethersulfone (PES), polycarbonate (PC), polyimide (PI), polyethylene terephthalate (PET), polyethylene naphthalate (PEN), polyacrylate (PAR), fiber reinforced plastic (FRP), or the like.

The substrate 610 may have a thickness in a range from about 5 µm to about 200 µm. When the substrate 610 has a thickness of less than about 5 µm, it is difficult for the substrate 610 to stably support the light emitting element EE. When the substrate 610 has a thickness of greater than about 200 µm, the flexible characteristics of the substrate 610 may be degraded.

A buffer layer 611 may be disposed on the substrate 610. The buffer layer 611 may prevent or reduce permeation of impurities and planarize a surface therebelow. The buffer layer 611 may include at least one of silicon nitride, silicon oxide, silicon oxynitride, or the like. However, the buffer layer 611 may be omitted based on the kinds of the substrate 610 and process conditions thereof.

A switching semiconductor layer 621 and a driving semiconductor layer 622 may be disposed on the buffer layer 611. The switching semiconductor layer 621 and the driving semiconductor layer 622 may be formed of at least one of a polycrystalline silicon, an amorphous silicon, and/or an oxide semiconductor including, for example, an indium gallium zinc oxide (IGZO) and/or an indium zinc tin oxide (IZTO). For example, when the driving semiconductor layer 622 is formed of the polycrystalline silicon, the driving semiconductor layer 622 may include a channel region that is not doped with impurities and doped source and drain regions that are formed on opposite sides of the channel region. In such an exemplary embodiment, p-type impurities, such as boron (B), may be used as dopant ions and diborane ($B_2H_6$) is often used. Such impurities may vary depending on the kinds of TFTs. The driving TFT T2, according to the exemplary embodiments, is a p-channel metal oxide semiconductor (PMOS) TFT including p-type impurities, however, the driving TFT T2 is not limited thereto. In another exemplary embodiment, the driving TFT T2 may be an n-channel metal oxide semiconductor (NMOS) TFT or a complementary metal oxide semiconductor (CMOS) TFT.

A gate insulation layer 612 may be disposed on the switching semiconductor layer 621 and the driving semiconductor layer 622. The gate insulation layer 612 may include at least one of a tetraethyl orthosilicate (TEOS), a silicon nitride, and/or a silicon oxide. In the illustrated exemplary embodiment, the gate insulation layer 612 may have a double-layer structure in which a silicon nitride layer having a thickness of about 40 nm and a TEOS layer having a thickness of about 80 nm are sequentially stacked.

A gate wiring including gate electrodes 632 and 635 may be disposed on the gate insulation layer 612. The gate wiring may further include the gate line 631, a first capacitor plate 638, or the likes. The gate electrodes 632 and 635 may be disposed to overlap at least a portion of the semiconductor layers 621 and 622, for example, the channel region thereof. The gate electrodes 632 and 635 may serve to substantially prevent the channel region from being doped with impurities when source and drain regions of the semiconductor layers 621 and 622 are doped with impurities during the process of forming the semiconductor layers 621 and 622.

The gate electrodes 632 and 635 and the first capacitor plate 638 may be disposed on the same or substantially similar layer and include the same or substantially similar metal material. For example, the gate electrodes 632 and 635 and the first capacitor plate 638 may be formed of at least one of molybdenum (Mo), chromium (Cr), and/or tungsten (W).

An insulation interlayer 613 covering the gate electrodes 632 and 635 may be disposed on the gate insulation layer 612. The insulation interlayer 613, similar to the gate insulation layer 612, may include or may be formed of silicon nitride, silicon oxide, tetraethyl orthosilicate, or the like, however, the material of the insulation interlayer 613 is not limited thereto.

A data wiring including source electrodes 643 and 646 and drain electrodes 644 and 647 may be disposed on the insulation interlayer 613. The data wiring may further include the data line 641, the common power line 642, a second capacitor plate 648, or the like. The source electrodes 643 and 646 and the drain electrodes 644 and 647 may be connected to a source region and a drain region of the semiconductor layers 621 and 622, respectively, through a contact hole defined in the gate insulation layer 612 and the insulation interlayer 613.

The switching TFT T1 may include the switching semiconductor layer 621, the switching gate electrode 632, the switching source electrode 643, and the switching drain electrode 644, and the driving TFT T2 may include the driving semiconductor layer 622, the driving gate electrode 635, the driving source electrode 646, and the driving drain electrode 647. The capacitor CAP may include the first capacitor plate 638 and the second capacitor plate 648 with the insulation interlayer 613 interposed therebetween.

The switching TFT T1 may function as a switching element to select pixels to perform light emission. The switching gate electrode 632 may be connected to the gate line 631. The switching source electrode 643 may be connected to the data line 641. The switching drain electrode 644 may be spaced apart from the switching source electrode 643 and connected to the first capacitor plate 638.

The driving TFT T2 may apply driving power to a pixel electrode 650, which allows an emission layer 660 of the light emitting element EE in the selected pixel to emit light. The driving gate electrode 635 may be connected to the first capacitor plate 638. Each of the driving source electrode 646 and the second capacitor plate 648 may be connected to the common power line 642. The driving drain electrode 647 may be connected to the pixel electrode 650 of the light emitting element EE through a contact hole.

With the aforementioned structure, the switching TFT T1 may be driven by a gate voltage applied to the gate line 631 and may transmit data voltage applied to the data line 641 to the driving TFT T2. A voltage equivalent to a difference between a common voltage applied to the driving TFT T2 from the common power line 642 and the data voltage transmitted from the switching TFT T1 may be stored in the capacitor CAP, and a current corresponding to the voltage stored in the capacitor CAP may flow to the light emitting element EE through the driving TFT T2, such that the light emitting element EE may emit light.

A planarization layer 614 may be disposed to cover the data wiring (e.g., the data line 641, the common power line 642, the source electrodes 643 and 646, the drain electrodes 644 and 647, and the second capacitor plate 648, which are patterned into a substantially same layer on the insulation interlayer 613).

The planarization layer 614 may substantially eliminate a step difference and planarize a surface so as to increase luminance efficiency of the light emitting element EE formed thereon. The planarization layer 614 may include at least one of a polyacrylate resin, an epoxy resin, a phenolic resin, a polyamide resin, a polyimide resin, an unsaturated polyester resin, a polyphenylene ether resin, a polyphenylene sulfide resin, and/or a benzocyclobutene (BCB).

The pixel electrode 650 of the light emitting element EE may be disposed on the planarization layer 614. The pixel electrode 650 may be connected to the drain electrode 647 through a contact hole defined in the planarization layer 614.

A pixel defining layer 615 exposing at least a portion of the pixel electrode 650 to define a pixel area may be disposed on the planarization layer 614. The pixel electrode 650 may be disposed corresponding to the pixel area of the pixel defining layer 615. The pixel defining layer 615 may include at least one of a resin, such as a polyacrylate resin and/or a polyimide resin.

In the pixel area, the emission layer 660 may be disposed on the pixel electrode 650, and a common electrode 670 may be disposed on the pixel defining layer 615 and the emission layer 660. The emission layer 660 may include a low molecular weight organic material or a high molecular weight organic material. A hole injection layer HIL and/or a hole transporting layer HTL may also be disposed between the pixel electrode 650 and the emission layer 660, and an electron transporting layer ETL and/or an electron injection layer EIL may be further disposed between the emission layer 660 and the common electrode 670.

Each of the pixel electrode 650 and the common electrode 670 may be formed as a transmissive electrode, a transflective electrode, or a reflective electrode.

A transparent conductive oxide (TCO) may be used to form the transmissive electrode. The TCO may include at least one of an indium tin oxide (ITO), an indium zinc oxide (IZO), a zinc oxide (ZnO), and/or an indium oxide ($In_2O_3$).

A metal, such as at least one of a magnesium (Mg), silver (Ag), gold (Au), calcium (Ca), lithium (Li), chromium (Cr), aluminum (Al), and copper (Cu), or an alloy thereof, may be used to form the transflective electrode and the reflective electrode. In such an exemplary embodiment, whether an electrode is a transflective type or a reflective type may depend on the thickness of the electrode. The transflective electrode may have a thickness of about 200 nm or less, and the reflective electrode may have a thickness of about 300 nm or more. As the thickness of the transflective electrode decreases, light transmittance and resistance increase. As the thickness of the transflective electrode increases, light transmittance decreases. In addition, the transflective electrode and the reflective electrode may have a multilayer structure which includes a metal layer including a metal or a metal alloy and a TCO layer stacked on the metal layer.

A thin film encapsulation layer TFE may be disposed on the common electrode 670. The thin film encapsulation layer TFE may include inorganic layers 681, 683, and 685 and organic layers 682 and 684. Further, the thin film encapsulation layer TFE may have a structure in which the inorganic layers 681, 683, and 685 and the organic layers 682 and 684 are alternately stacked. In such an exemplary embodiment, the inorganic layer 681 may be disposed at a lowermost portion or position. For example, the inorganic layer 681 may be disposed most adjacent to (e.g., nearest to or directly on) the light emitting element EE.

FIG. 8 illustrates that the thin film encapsulation layer TFE includes three inorganic layers 681, 683, and 685 and two organic layers 682 and 684. However, the exemplary embodiments are not limited thereto.

The inorganic layers 681, 683, and 685 may include one or more inorganic materials including at least one of $Al_2O_3$, $TiO_2$, $ZrO$, $SiN_x$, $SiO_2$, $AlON$, $AlN$, $SiON$, $Si_3N_4$, $ZnO$, and/or $Ta_2O_5$. The inorganic layers 681, 683, and 685 may be formed by methods, such as a chemical vapor deposition (CVD) method or an atomic layer deposition (ALD) method. The inorganic layers 681, 683 and 685 may prevent or efficiently reduce permeation of, primarily, moisture and oxygen. Permeation of moisture and oxygen into the light emitting element EE may be largely prevented by the inorganic layers 681, 683 and 685.

The organic layers 682 and 684 may include polymer-based material. Examples of the polymer-based material may include, for example, at least one of an acrylic resin, an epoxy resin, a polyimide, and/or a polyethylene. In addition, the organic layers 682 and 684 may be formed by a thermal deposition process. The thermal deposition process for forming the organic layers 682 and 684 may be performed in a temperature range that may not damage the light emitting element EE.

The thin film encapsulation layer TFE may have a thickness of about 10 μm or less. Accordingly, the overall thickness of the display panel 600 may be small. By applying the thin film encapsulation layer TFE in such a manner, flexible characteristics of the display panel 600 may be improved.

Hereinafter, a method of operating a foldable display device 10 according to the illustrated exemplary embodiment will be described with reference to FIGS. 2 to 4 and 9 to 11.

Figure 9:
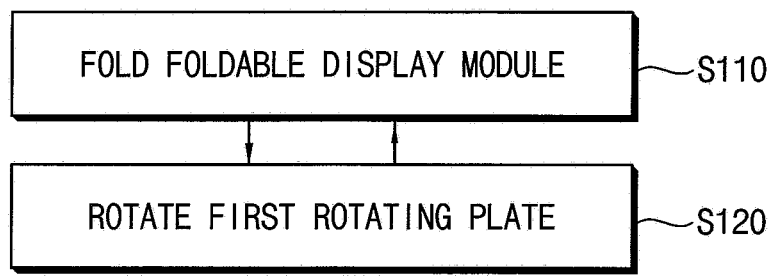
FIG. 9 is a flowchart illustrating an exemplary method of operating a foldable display device according to principles of the invention.
Figure 11:
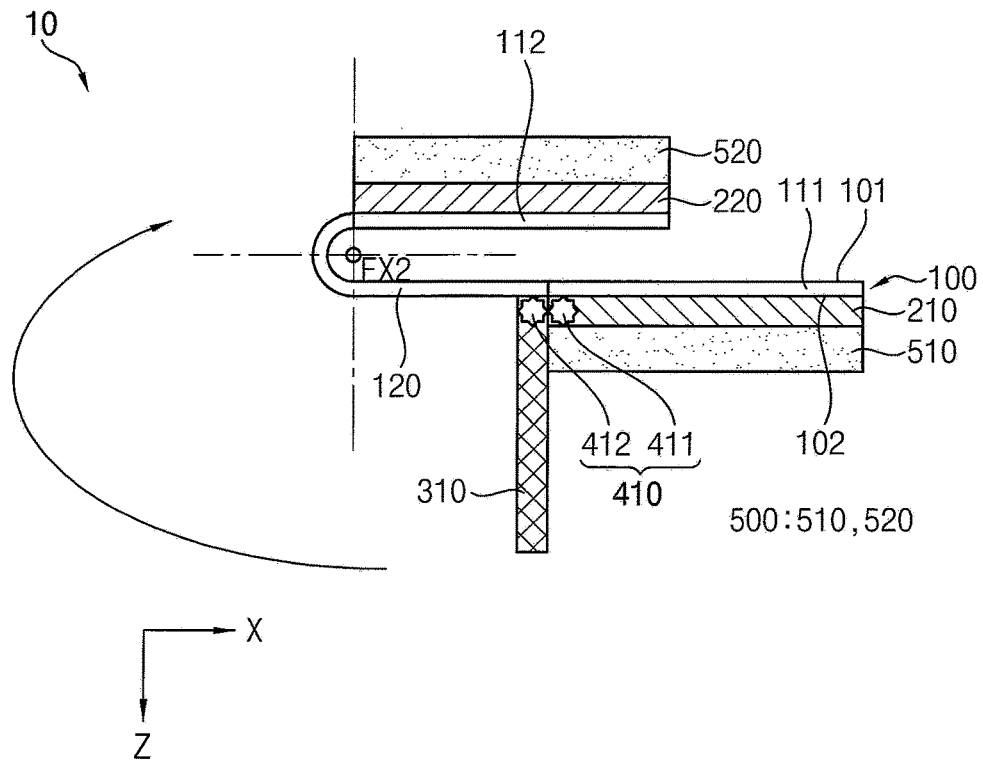
FIG. 11 is a cross-sectional view illustrating an exemplary method of inwardly folding the outwardly folded foldable display device of FIG. 3.

FIG. 9 is a flowchart illustrating an exemplary method of operating a foldable display device according to principles of the invention. FIG. 10 is a cross-sectional view illustrating an exemplary embodiment of a method of outwardly folding the unfolded foldable display device of FIG. 2. FIG. 11 is a cross-sectional view illustrating an exemplary method of inwardly folding the outwardly folded foldable display device of FIG. 3.

Referring to FIGS. 2, 3, 9 and 10, in the illustrated exemplary embodiment, when the foldable display module 100 is folded from the un-folded mode or the in-folded mode to the out-folded mode, the foldable display module 100 may be folded (S110) after rotating the first rotating plate 310 (S120). Hereinafter, an exemplary operating method in which the foldable display module 100 is folded from the un-folded mode to the out-folded mode will be described with reference to FIGS. 2, 3 and 10, however, the operating method may be applied to an operating method in which the foldable display module 100 is folded from the in-folded mode to the out-folded mode.

First, the first rotating plate 310 may be rotated (S120) as illustrated in FIGS. 2 and 10. The first rotating plate 310 parallel to the first plate 210 may be rotated counter-clockwise by a user such that the first rotating plate 310 is not parallel to (for example, generally perpendicular to) the first plate 210. The first gear 411 and the second gear 412 of the first gear portion 410 may be rotated in opposite directions from each other to rotate the first rotating plate 310 with respect to the first plate 210. For example, the first gear 411 and the second gear 412 may be respectively rotated in a clockwise direction and in a counter-clockwise direction to rotate the first rotating plate 310 in the counter-clockwise direction.

Then, the foldable display module 100 may be folded (S110) as illustrated in FIG. 3. The folding portion 120 may be folded around the first folding axis FX1 located in the Z-axis direction from the foldable display module 100 to outwardly fold the foldable display module 100. In this case, the folding portion 120 may be symmetrically folded with respect to the first folding axis FX1 such that the first non-folding portion 111 and the second non-folding portion 112 are symmetrically located with respect to the first folding axis FX1.

In the un-folded mode or the in-folded mode, the first rotating plate 310 may support the folding portion 120, and when the folding portion 120 is outwardly folded while the first rotating plate 310 supports the folding portion 120, the folding portion 120 may be damaged by the first rotating plate 310. Accordingly, the first rotating plate 310 may be rotated before outwardly folding the folding portion 120, so that the folding portion 120 may not be damaged and the foldable display module 100 may be easily folded.

Referring to FIGS. 3, 4, 9 and 11, in an exemplary embodiment, when the foldable display module 100 is folded from the out-folded mode to the un-folded mode or the in-folded mode, the first rotating plate 310 may be rotated (S120) after folding the foldable display module 100 (S110). Hereinafter, an operating method in which the foldable display module 100 is folded from the out-folded mode to the in-folded mode will be described with reference to FIGS. 3, 4 and 11, however, the operating method may be applied to an operating method in which the foldable display module 100 is folded from the out-folded mode to the un-folded mode.

First, the foldable display module 100 may be folded (S110) as illustrated in FIGS. 3 and 11. The folding portion 120 may be folded around the second folding axis FX2 in the Y-axis in a Z-axis direction from the foldable display module 100 to in-fold the foldable display module 100. In this case, the folding portion 120 may be asymmetrically folded with respect to the second folding axis FX2 such that the first non-folding portion 111 and the second non-folding portion 112 are asymmetrically located with respect to the second folding axis FX2.

Then, the first rotating plate 310 may be rotated (S120) as illustrated in FIG. 4. The first rotating plate 310 unparallel to (for example, generally perpendicular to) the first plate 210 may be rotated such that the first rotating plate 310 is generally parallel to the first plate 210. The first gear 411 and the second gear 412 of the first gear portion 410 may be rotated in opposite directions from each other to rotate the first rotating plate 310 with respect to the first plate 210. For example, the first gear 411 and the second gear 412 may be respectively rotated in a counter-clockwise direction and in a clockwise direction to rotate the first rotating plate 310 in the clockwise direction.

In the out-folded mode, the first rotating plate 310 may not support the folding portion 120, and when the first rotating plate 310 does not support the folding portion 120, the foldable display module 100 may be deformed due to restoring force. Accordingly, the first rotating plate 310 may be rotated after inwardly folding the folding portion 120, so that the first rotating plate 310 may support a part of the folding portion 120 which is not supported, and the deformation of the foldable display module 100 due to the restoring force may be prevented.

Hereinafter, a foldable display device 20 according to another illustrated embodiment will be described with reference to FIGS. 12 to 15.

Figure 12:
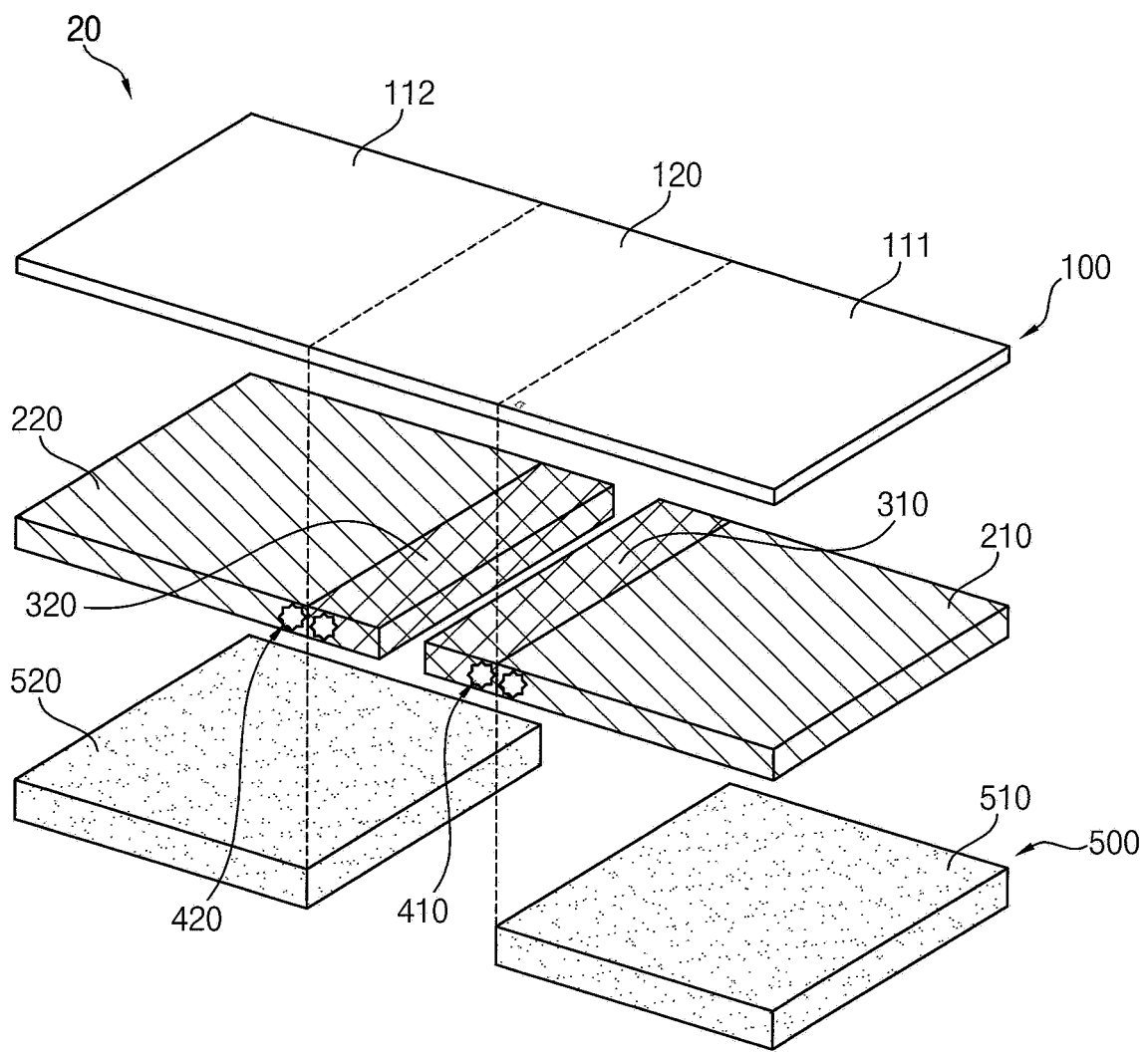
FIG. 12 is an exploded perspective view illustrating another exemplary embodiment of a foldable display device constructed according to principles of the invention.
Figure 13:
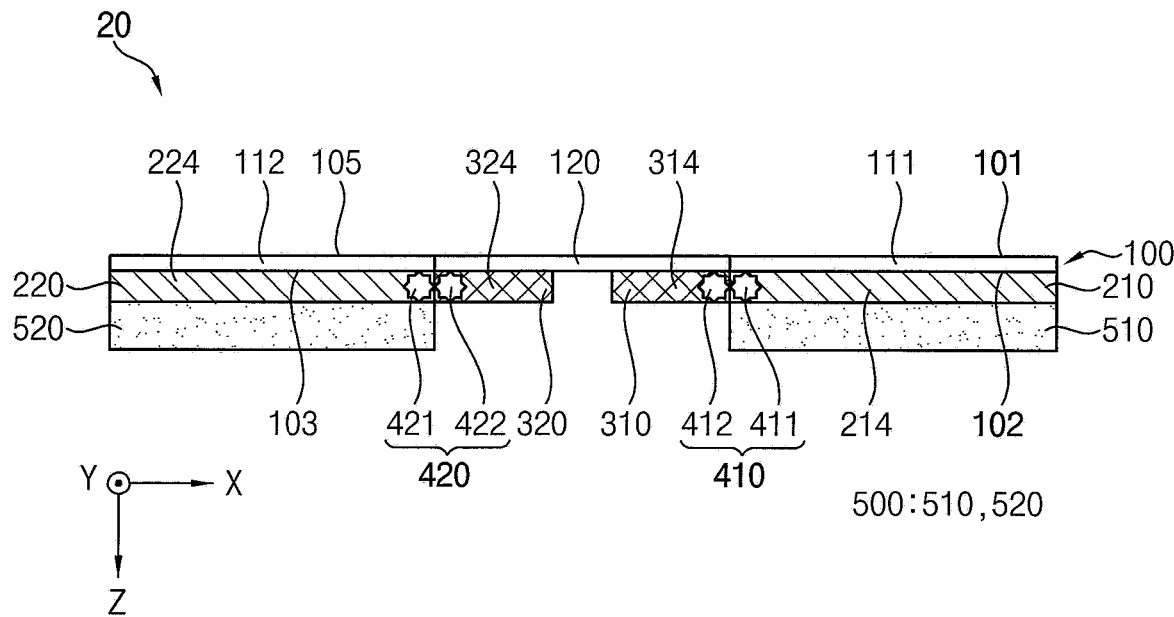
FIG. 13 is a cross-sectional view illustrating the foldable display device of FIG. 12 in an unfolded position.
Figure 14:
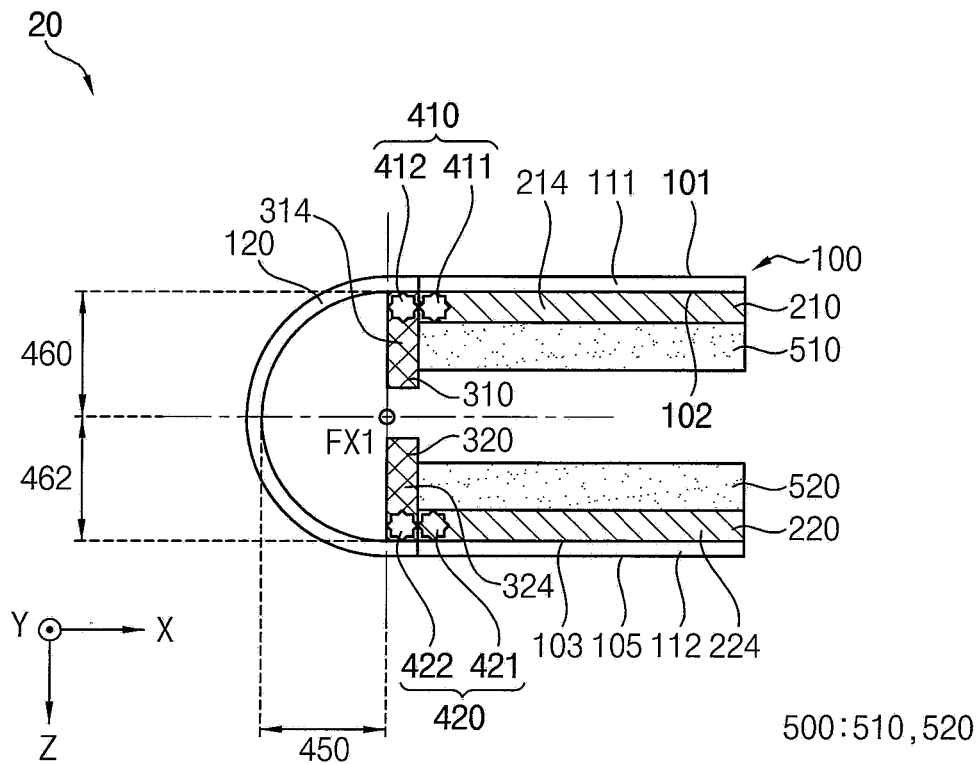
FIG. 14 is a cross-sectional view illustrating the foldable display device of FIG. 12 in an outwardly folded position.
Figure 15:
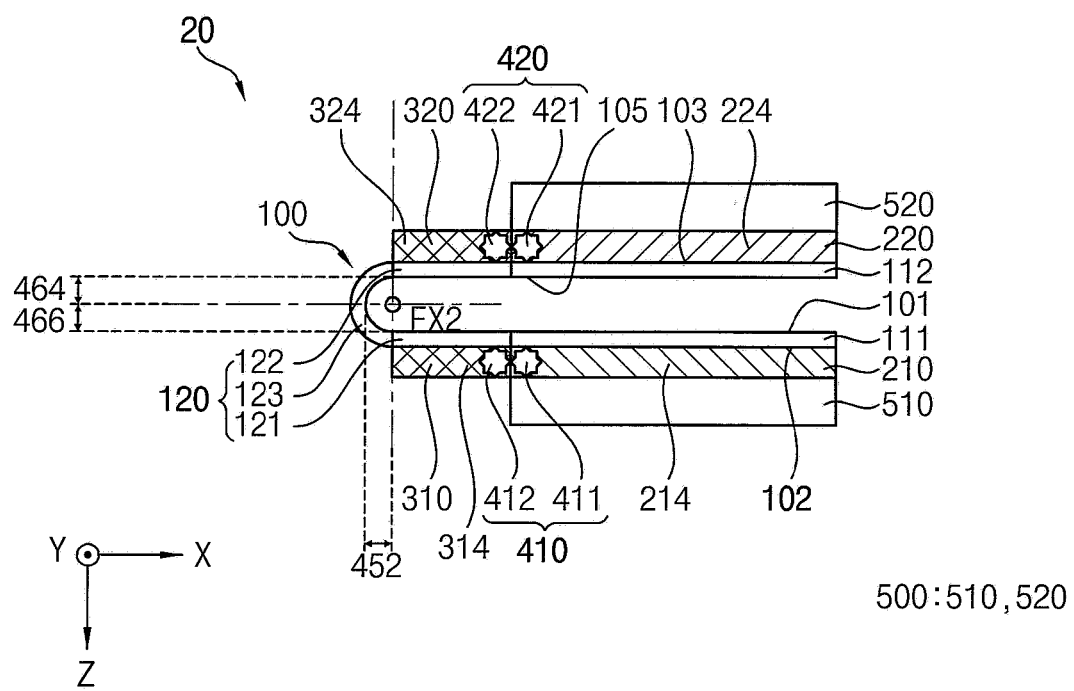
FIG. 15 is a cross-sectional view illustrating the foldable display device of FIG. 12 in an inwardly folded position.

FIG. 12 is an exploded perspective view illustrating another exemplary embodiment of a foldable display device constructed according to principles of the invention. FIG. 13 is a cross-sectional view illustrating the foldable display device of FIG. 12 in an unfolded position. FIG. 14 is a cross-sectional view illustrating the foldable display device of FIG. 12 in an outwardly folded position. FIG. 15 is a cross-sectional view illustrating the foldable display device of FIG. 12 in an inwardly folded position.

Referring to FIGS. 12, 13, 14 and 15, a flexible or foldable display device 10 may include a foldable display module 100, a first plate 210, a second plate 220, a first rotating plate 310, a second rotating plate 320, a first gear portion 410, a second gear portion 420, and a jig 500. Detailed descriptions on elements of the foldable display device 20 described with reference to FIGS. 12 to 15, which are substantially the same as or similar to those of the foldable display device 20 described with reference to FIGS. 1 to 4 and 6 to 8, will not be repeated to avoid redundancy.

Figure 17:
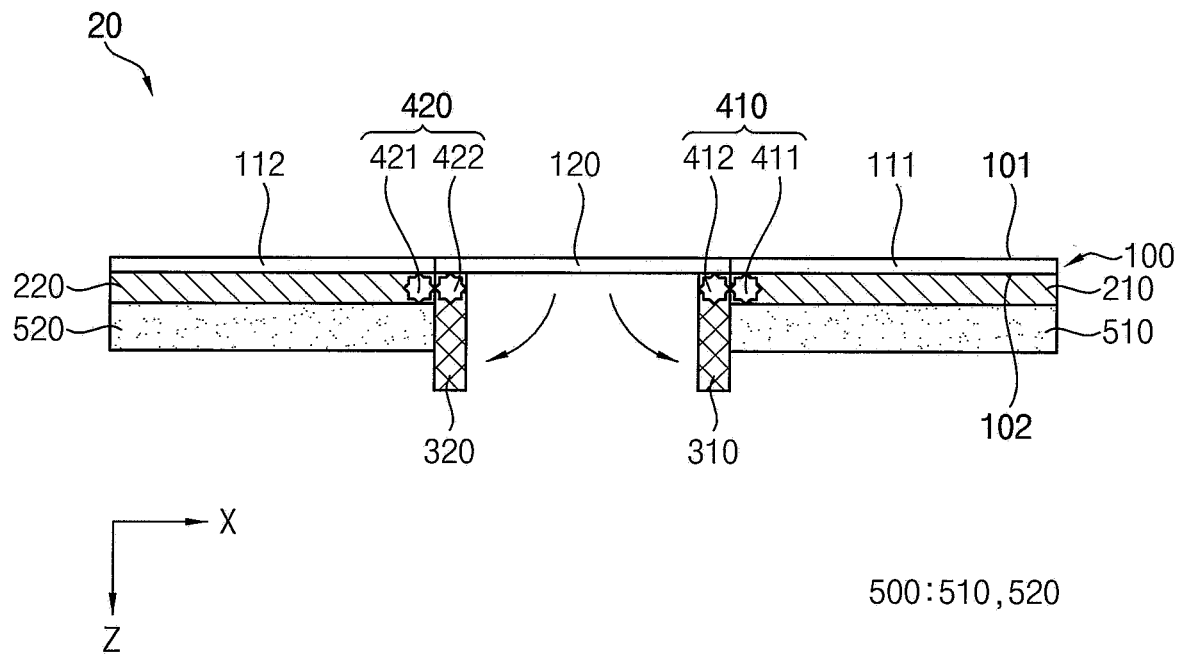
FIG. 17 is a cross-sectional view illustrating an exemplary method of outwardly folding the unfolded foldable display device of FIG. 13.

The second rotating plate 320 may be rotatably connected to the second plate 220. The second rotating plate 320 may be rotatably connected to the second plate 220 through the second gear portion 420. The second gear portion 420 may include a third gear 421 and a fourth gear 422. The third gear 421 may be rotatably supported in and disposed on the side 224 of the second plate 220, and the fourth gear 422 may be fixedly supported in and disposed on the side 324 of the second rotating plate 320. The third gear 421 and the fourth gear 422 may be engaged with each other for supporting the second rotating plate 320 for rotation relative to the second plate 220, and the direction of rotation of the third gear 421 and the direction of rotation of the fourth gear 422 may be opposite to each other, e.g., one may be clockwise and the other counter-clockwise. The second rotating plate 320 may be rotated with respect to the second plate 220 by the rotation of the third gear 421 and the fourth gear 422 by a user moving the first and second rotating plates 310 and 320, e.g., respectively, counter-clockwise and clockwise as shown in FIG. 17.

The sum of the area of the first rotating plate 310 and the area of the second rotating plate 320 may be less than the area of the folding portion 120. For example, the width of the first rotating plate 310 in the X-axis direction and the width of the second rotating plate 320 in an X-axis direction may be less than the width of the folding portion 120 in the X-axis direction.

The second rotating plate 320 may be made from any rigid, supporting material including metal, plastic, or the like. For example, the metal may be, independently, an alloy as described above for the first plate 210. In the illustrated exemplary embodiment, the second rotating plate 320 may include a material substantially the same as those of the first plate 210, the second plate 220, and/or the first rotating plate 310.

As illustrated in FIG. 13, in the un-folded mode, the first rotating plate 310 and the second rotating plate 320 may be disposed on the folding portion 120 and support the folding portion 120. Specifically, the first rotating plate 310 may be disposed on a part of the folding portion 120 adjacent to the first non-folding portion 111 and support the part of the folding portion 120 adjacent to the first non-folding portion 111, and the second rotating plate 320 may be disposed on a part of the folding portion 120 adjacent to the second non-folding portion 112 and support the part of the folding portion 120 adjacent to the second non-folding portion 112. In this case, the first rotating plate 310 and the second rotating plate 320 may be disposed on the non-display surface 102 of the folding portion 120.

As illustrated in FIG. 14, in the out-folded mode, the first rotating plate 310 may not be parallel to the first plate 210, and the second rotating plate 320 may not be parallel to the second plate 220. In this case, the first rotating plate 310 and the second rotating plate 320 may not support all of the folding portion 120. In the illustrated exemplary embodiment, the first rotating plate 310 may be generally perpendicular to the first plate 210, and the second rotating plate 320 may be generally perpendicular to the second plate 220. For example, the first plate 210 and the second plate 220 may extend along the X-axis direction, and the first rotating plate 310 and the second rotating plate 320 may extend along the Z-axis direction.

As illustrated in FIG. 15, in the in-folded mode, the folding portion 120 may include a first region 121 adjacent to the first non-folding portion 111 and a second region 122 adjacent to the second non-folding portion 112, and a third region 123 disposed between the first region 121 and the second region 122. Because the radius of curvature of the folding portion 120 in the in-folded mode is less than the radius of curvature of the folding portion 120 in the out-folded mode, the folding portion 120 may include an unfolded region and a folded region in the in-folded mode. In the illustrated exemplary embodiment, the first region 121 and the second region 122 of the folding portion 120 may not be folded, and the third region 123 of the folding portion 120 may be folded. In this case, the first region 121 and the second region 122 may be substantially planar.

In the in-folded mode, the folding portion 120 may be symmetrically folded with respect to the second folding axis FX2. In other words, in the in-folded mode, the folding portion 120 may be folded such that the first non-folding portion 111 and the second non-folding portion 112 are symmetrically located with respect to the second folding axis FX2. For example, the shortest distance 466 from the second folding axis FX2 to the first non-folding portion 111 may be generally equal to the shortest distance 464 from the second folding axis FX2 to the second non-folding portion 112. The distance in the X-axis direction from the second folding axis FX2 to the first non-folding portion 111 may be generally equal to the distance in the X-axis direction from the second folding axis FX2 to the second non-folding portion 112, and the distance 466 in the Z-axis direction from the second folding axis FX2 to the first non-folding portion 111 may be generally equal to the distance 464 in the Z-axis direction from the second folding axis FX2 to the second non-folding portion 112.

In the in-folded mode, the first rotating plate 310 may be generally parallel to the first plate 210, and the second rotating plate 320 may be generally parallel to the second plate 220. The first rotating plate 310 may be disposed on the first region 121 of the folding portion 120 and support the first region 121 of the folding portion 120, and the second rotating plate 320 may be disposed on the second region 122 of the folding portion 120 and support the second region 122 of the folding portion 120. In other words, the first rotating plate 310 and the second rotating plate 320 may be disposed on an unfolded port of the folding portion 120 and support the unfolded part in the in-folded mode. In this case, the first rotating plate 310 may be disposed on the non-display surface 102 of the first region 121 of the folding portion 120, and the second rotating plate 320 may be disposed on the non-display surface 103 of the second region 122 of the folding portion 120.

Hereinafter, a method of operating a foldable display device 10 according to an exemplary embodiment will be described with reference to FIGS. 13 to 18.

Figure 16:
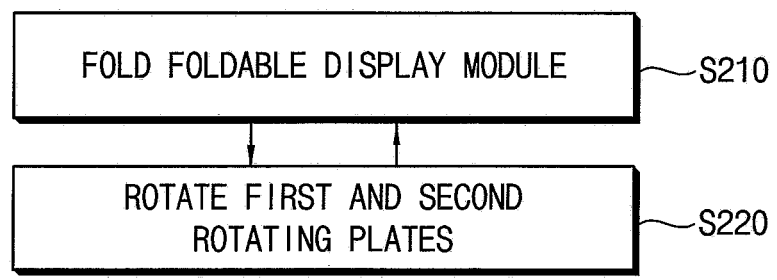
FIG. 16 is a flowchart illustrating an exemplary method of operating a foldable display device according to principles of the invention.
Figure 18:
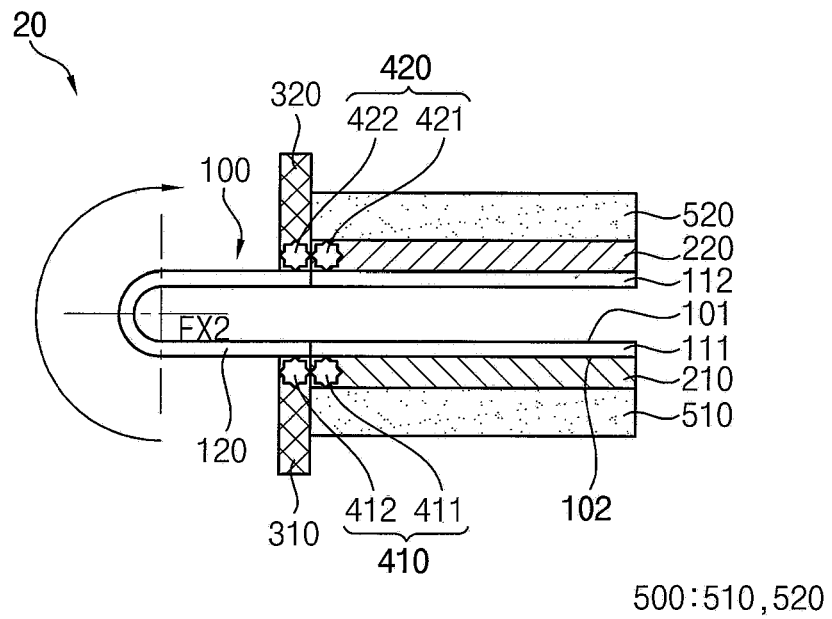
FIG. 18 is a cross-sectional view illustrating an exemplary method of inwardly folding the outwardly folded foldable display device of FIG. 14.

FIG. 16 is a flowchart illustrating an exemplary method of operating a foldable display device according to principles of the invention. FIG. 17 is a cross-sectional view illustrating an exemplary method of outwardly folding the unfolded foldable display device of FIG. 13. FIG. 18 is a cross-sectional view illustrating an exemplary method of inwardly folding the outwardly folded foldable display device of FIG. 14.

Referring to FIG. 16, a method of operating a foldable display device 20 may include folding a foldable display module (S210) and rotating first and second rotating plates (S220). The order of the steps (S210 and S220) may be changed according to folding modes (the un-folded mode, the out-folded mode, and the inwardly folded mode). Detailed descriptions of the method of operating the foldable display device 20 described with reference to FIGS. 13 to 18, which are substantially the same as or similar to those of the method of operating the foldable display device 10 described with reference to FIGS. 2 to 4 and 9 to 11, will not be repeated to avoid redundancy.

Referring to FIGS. 13, 14, 16 and 17, when the foldable display module 100 is folded from the un-folded mode or the inwardly folded mode to the out-folded mode, the foldable display module 100 may be folded (S210) after rotating the first and second rotating plates 310 and 320 (S220). Hereinafter, an operating method in which the foldable display module 100 is folded from the un-folded mode to the out-folded mode will be described with reference to FIGS. 13, 14 and 17, however, the operating method may be applied to an operating method in which the foldable display module 100 is folded from the inwardly folded mode to the out-folded mode.

First, the first and second rotating plates 310 and 320 may be rotated (S220) as illustrated in FIGS. 13 and 17. The first rotating plate 310 generally parallel to the first plate 210 may be rotated such that the first rotating plate 310 is not parallel to (for example, generally perpendicular to) the first plate 210, and the second rotating plate 320 generally parallel to the second plate 220 may be rotated such that the second rotating plate 320 is not parallel to (for example, generally perpendicular to) the second plate 220. The first gear 411 and the second gear 412 of the first gear portion 410 may be rotated in opposite directions from each other to rotate the first rotating plate 310 with respect to the first plate 210, and the third gear 421 and the fourth gear 422 of the second gear portion 420 may be rotated in opposite directions from each other to rotate the second rotating plate 320 with respect to the second plate 220. For example, the first gear 411 and the second gear 412 may be respectively rotated in a clockwise direction and in a counter-clockwise direction to rotate the first rotating plate 310 in the counter-clockwise direction, and the third gear 421 and the fourth gear 422 may be respectively rotated in the counter-clockwise direction and in the clockwise direction to rotate the second rotating plate 320 in the clockwise direction.

Then, the foldable display module 100 may be folded (S210) as illustrated in FIG. 14. In the un-folded mode or the inwardly folded mode, the first and second rotating plates 310 and 320 may support the folding portion 120, and when the folding portion 120 is outwardly folded while the first and second rotating plates 310 and 320 support the folding portion 120, the folding portion 120 may be damaged by the first and second rotating plates 310 and 320. Accordingly, the first and second rotating plates 310 and 320 may be rotated before outwardly folding the folding portion 120, so that the folding portion 120 may not be damaged and the foldable display module 100 may be easily folded.

Referring to FIGS. 14, 15, 16 and 18, when the foldable display module 100 is folded from the out-folded mode to the un-folded mode or the inwardly folded mode, the first and second rotating plates 310 and 320 may be rotated (S220) after folding the foldable display module 100 (S210). Hereinafter, an operating method in which the foldable display module 100 is folded from the out-folded mode to the inwardly folded mode will be described with reference to FIGS. 14, 15 and 18, however, the operating method may be applied to an operating method in which the foldable display module 100 is folded from the out-folded mode to the un-folded mode.

First, the foldable display module 100 may be folded (S210) as illustrated in FIGS. 14 and 18. The folding portion 120 may be folded around the second folding axis FX2 located in the Z-axis direction from the foldable display module 100 to in-fold the foldable display module 100. In this case, the folding portion 120 may be symmetrically folded with respect to the second folding axis FX2 such that the first non-folding portion 111 and the second non-folding portion 112 are symmetrically located with respect to the second folding axis FX2.

Then, the first and second rotating plates 310 and 320 may be rotated (S220) as illustrated in FIG. 15. The first rotating plate 310 unparallel to (for example, generally perpendicular to) the first plate 210 may be rotated such that the first rotating plate 310 is generally parallel to the first plate 210, and the second rotating plate 320 unparallel to (for example, generally perpendicular to) the second plate 220 may be rotated such that the second rotating plate 320 is generally parallel to the second plate 220. The first gear 411 and the second gear 412 of the first gear portion 410 may be rotated in opposite directions from each other to rotate the first rotating plate 310 with respect to the first plate 210, and the third gear 421 and the fourth gear 422 of the second gear portion 420 may be rotated in opposite directions from each other to rotate the second rotating plate 320 with respect to the second plate 220. For example, the first gear 411 and the second gear 412 may be respectively rotated in a counter-clockwise direction and in a clockwise direction to rotate the first rotating plate 310 in the clockwise direction, and the third gear 421 and the fourth gear 422 may be respectively rotated in the clockwise direction and in the counter-clockwise direction to rotate the second rotating plate 320 in the counter-clockwise direction.

In the out-folded mode, the first and second rotating plates 310 and 320 may not support all of the folding portion 120, and when the first and second rotating plates 310 and 320 do not support the folding portion 120, the foldable display module 100 may be deformed due to restoring force. Accordingly, the first and second rotating plates 310 and 320 may be rotated after inwardly folding the folding portion 120, so that the first and second rotating plates 310 and 320 may support a part of the folding portion 120 which is not supported, and the deformation of the foldable display module 100 due to the restoring force may be reduced or prevented.

Hereinafter, a foldable display device 10 according to an exemplary embodiment will be described with reference to FIGS. 19 to 21.

Figure 19:
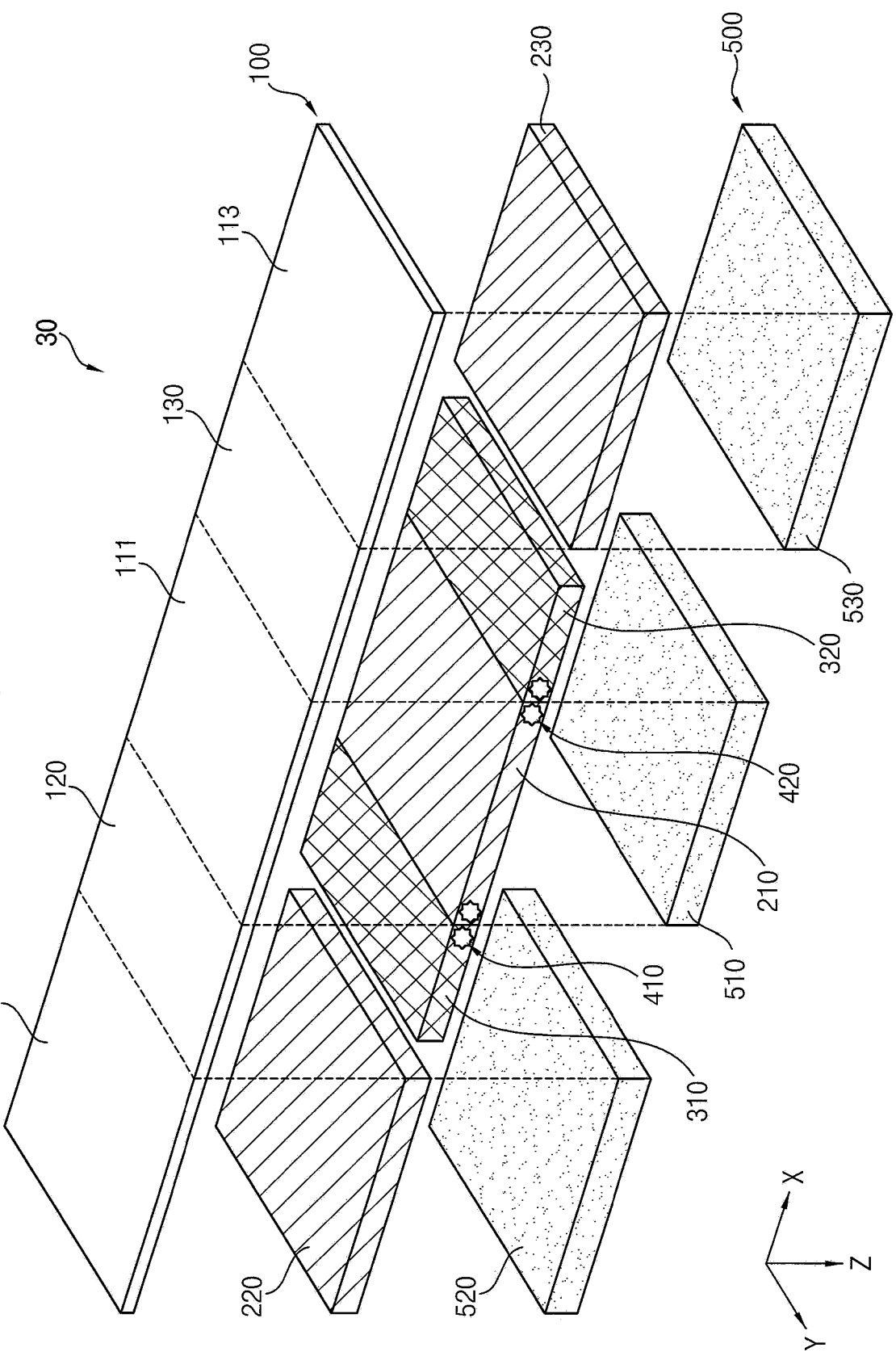
FIG. 19 is an exploded perspective view illustrating yet another exemplary embodiment of a foldable display device constructed according to principles of the invention.

FIG. 19 is an exploded perspective view illustrating yet another exemplary embodiment of a foldable display device constructed according to principles of the invention. FIG. 20 is a cross-sectional view illustrating the foldable display device of FIG. 19 in an unfolded position. FIG. 21 is a cross-sectional view illustrating the foldable display device of FIG. 19 in a folded position.

Figure 20:
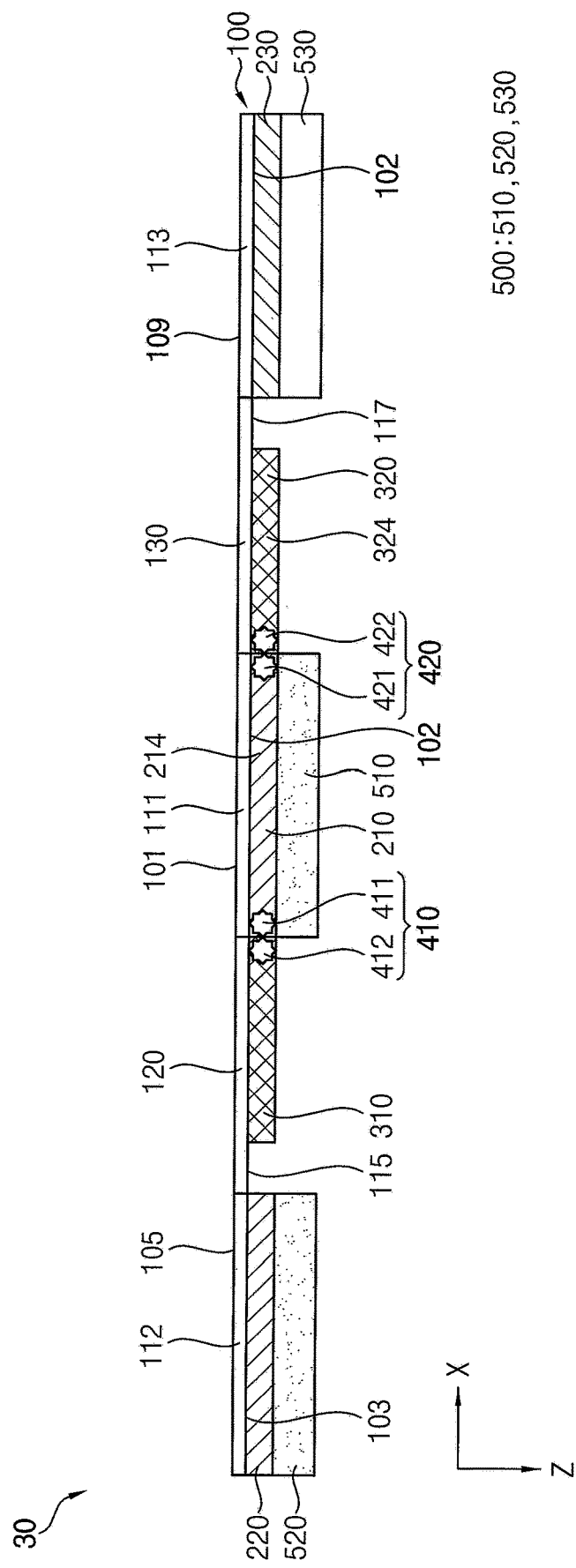
FIG. 20 is a cross-sectional view illustrating the foldable display device of FIG. 19 in an unfolded position.
Figure 21:
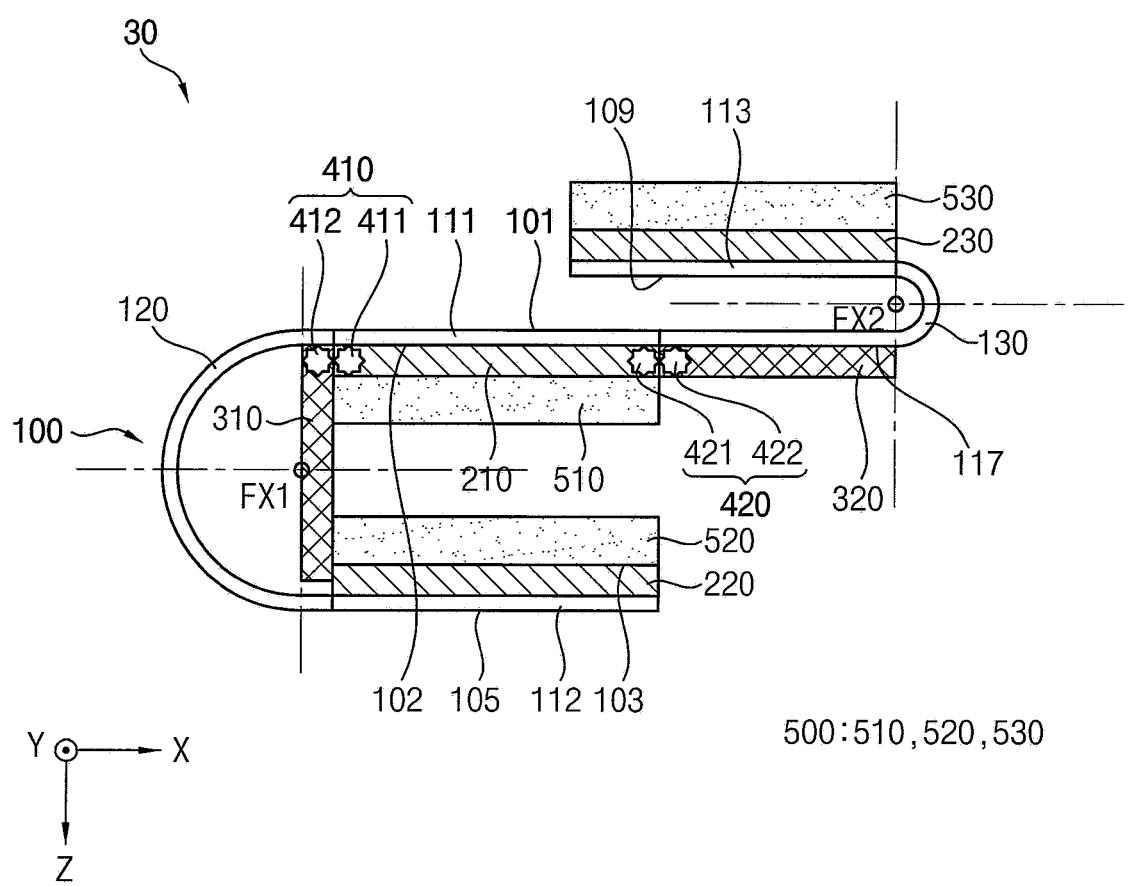
FIG. 21 is a cross-sectional view illustrating the foldable display device of FIG. 19 in a folded position.

Referring to FIGS. 19, 20 and 21, a flexible or foldable display device 30 may include a foldable display module 100, a first plate 210, a second plate 220, a third plate 230, a first rotating plate 310, a second rotating plate 320, a first gear portion 410, a second gear portion 420, and a jig 500. Detailed descriptions on elements of the foldable display device 30 described with reference to FIGS. 19 to 21, which are substantially the same as or similar to those of the foldable display device 30 described with reference to FIGS. 1 to 4 and 6 to 8, will not be repeated to avoid redundancy.

The foldable display module 100 may include a first non-folding portion 111, a second non-folding portion 112, a third non-folding portion 113, a first folding portion 120 and a second folding portion 130. The second folding portion 130 may be disposed between the first non-folding portion 111 and the third non-folding portion 113. The first non-folding portion 111 and the third non-folding portion 113 may be spaced apart from each other with the second folding portion 130 therebetween. The first non-folding portion 111, the second non-folding portion 112, and the third non-folding portion 113 may be unfolded portions in the foldable display module 100. The first folding portion 120 and the second folding portion 130 may be folded portions in the foldable display module 100.

The third plate 230 may be disposed on the third non-folding portion 113 of the foldable display module 100 and support the third non-folding portion 113. The third plate 230 may be disposed on the non-display surface 102 of the third non-folding portion 113. In an exemplary embodiment, an adhesive layer may be interposed between the third non-folding portion 113 of the foldable display module 100 and the third plate 230 so that the third plate 230 may be attached on the non-display surface 102 of the third non-folding portion 113. For example, the adhesive layer may be at least one of an optically clear adhesive, a pressure sensitive adhesive, or the like.

The third plate 230 may have substantially the same shape as that of the third non-folding portion 113 of the foldable display module 100 in a plan view, and may generally overlap the third non-folding portion 113. For example, the area of the third plate 230 may be substantially equal to that of the third non-folding portion 113. The third plate 230 may include at least one of metal, plastic, or the like to provide rigid support. For example, the metal may be, independently, an alloy as described above for the first plate 210. In an exemplary embodiment, the third plate 230 may include a material substantially the same as those of the first plate 210 and/or the second plate 220.

The first rotating plate 310 may be rotatably connected to a first side of the first plate 210. For example, the first side of the first plate 210 may be located in the X-axis direction from a center of the first plate 210. The first rotating plate 310 may be rotatably connected to the first side of the first plate 210 through the first gear portion 410.

The second rotating plate 320 may be rotatably connected to a second side of the first plate 210. The second side of the first plate 210 may be opposite to the first side of the first plate 210. For example, the second side of the first plate 210 may be located in the X-axis direction from the center of the first plate 210. The second rotating plate 320 may be rotatably connected to the second side of the first plate 210 through the second gear portion 420. The second gear portion 420 may include a third gear 421 and a fourth gear 422. The third gear 421 may be rotatably supported in and disposed on the side 214 of the first plate 210, and the fourth gear 422 may be fixedly supported in and disposed on the side 324 of the second rotating plate 320. The third gear 421 and the fourth gear 422 may be engaged with each other for supporting the second rotating plate 320 for rotation relative to the first plate 210, and the direction of rotation of the third gear 421 and the direction of rotation of the fourth gear 422 may be opposite to each other, e.g., one may be clockwise and the other counter-clockwise. The second rotating plate 320 may be rotated with respect to the first plate 210 by the rotation of the third gear 421 and the fourth gear 422 by a user moving the second rotating plate 320, e.g., clockwise.

The area of the second rotating plate 320 may be less than the area of the second folding portion 130. For example, the width of the second rotating plate 320 in the X-axis direction may be less than the width of the second folding portion 130 in the X-axis direction. The second rotating plate 320 may include at least one of metal, plastic, or the like to provide rigid support. For example, the metal may be, independently, an alloy as described above for the first plate 210. In the illustrated exemplary embodiment, the second rotating plate 320 may include a material substantially the same as those of the first plate 210, the second plate 220, the third plate 230, and/or the first rotating plate 310.

The jig 500 may be disposed on the first plate 210, the second plate 220 and the third plate 230. The jig 500 may include a first jig 510, a second jig 520 and a third jig 530. The first jig 510 may be disposed on the first plate 210, the second jig 520 may be disposed on the second plate 220, and the third jig 530 may be disposed on the third plate 230.

As illustrated in FIG. 20, the foldable display module 100 may be unfolded. In the illustrated exemplary embodiment, the first folding portion 120 and the second folding portion 130 of the foldable display module 100 may not be folded, and the display surface 101 of the first non-folding portion 111, the display surface 105 of the second non-folding portion 112, and the display surface 109 of the third non-folding portion 113 of the foldable display module 100 may face the same direction, for example, the Z-axis direction.

In the un-folded mode, the first rotating plate 310 may be disposed on the first folding portion 120 and support the first folding portion 120, and the second rotating plate 320 may be disposed on the second folding portion 130 and support the second folding portion 130. In this case, the first rotating plate 310 may be disposed on the non-display surface 115 of the first folding portion 120, and the second rotating plate 320 may be disposed on the non-display surface 117 of the second folding portion 130.

As illustrated in FIG. 21, the foldable display module 100 may be outwardly folded with respect to a first folding axis FX1, and may be inwardly folded with respect to a second folding axis FX2. In the illustrated exemplary embodiment, the first folding portion 120 of the foldable display module 100 may be folded such that the non-display surface 102 of the first non-folding portion 111 and the non-display surface 103 of the second non-folding portion 112 of the foldable display module 100 may face each other, and the second folding portion 130 of the foldable display module 100 may be folded such that the display surface 101 of the first non-folding portion 111 and the display surface 109 of the third non-folding portion 113 of the foldable display module 100 may face each other. For example, the display surface 105 of the second non-folding portion 112 may face the outside of the foldable display device 10, and the display surface 109 of the third non-folding portion 113 may face the inside of the foldable display device 10.

The first rotating plate 310 may not be parallel to the first plate 210. In this case, the first rotating plate 310 may not support or substantially support the first folding portion 120. In the illustrated exemplary embodiment, the first rotating plate 310 may be generally perpendicular to the first plate 210. For example, the first plate 210 may extend generally along the X-axis direction, and the first rotating plate 310 may extend generally along the Z-axis direction.

The second rotating plate 320 may be generally parallel to the first plate 210. The second rotating plate 320 may be disposed on a part of the second folding portion 130, and support the part of the second folding portion 130. In this case, the second rotating plate 320 may be disposed on the non-display surface 117 of the part of the second folding portion 130. In other words, the second rotating plate 320 may be disposed on an unfolded part of the second folding portion 130 and support the unfolded part.

Although FIG. 21 illustrates an exemplary embodiment in which the foldable display module 100 is outwardly folded in the first folding portion 120 and in-folded in the second folding portion 130, however, in another exemplary embodiment, the foldable display module 100 may be inwardly folded in the first folding portion 120 and outwardly folded in the second folding portion 130. Further, the foldable display module 100 may be outwardly folded in each of the first folding portion 120 and the second folding portion 130, or the foldable display module 100 may be inwardly folded in each of the first folding portion 120 and the second folding portion 130.

FIGS. 19 to 21 illustrate an exemplary embodiment in which the first rotating plate 310 and the second rotating plate 320 are rotatably connected to the first plate 210, however, in another exemplary embodiment, the first rotating plate 310 may be rotatably connected to the second plate 220, or the second rotating plate 320 may be rotatably connected to the third plate 230, operate similarly as described above.

The foldable display device according to the exemplary embodiments may be applied to any type of display device including those in a computer, a notebook, a mobile phone, a smartphone, a smart pad, a PMP, a PDA, an MP3 player, or the like.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A foldable display device, comprising:
   a foldable display module including a first non-folding portion, a second non-folding portion, and a folding portion disposed between the first non-folding portion and the second non-folding portion;
   a first support member disposed on the first non-folding portion supporting the first non-folding portion;
   a second support member disposed on the second non-folding portion supporting the second non-folding portion; and
   a third member rotatably coupled to the first support member and not coupled to the second support member,
   wherein the first support member comprises a first plate, the second support member comprises a second plate, the third member comprises a rotatable plate abutting an end of the first plate, and, in an out-folded mode when the folding portion is folded such that a non-display surface of the first non-folding portion and a non-display surface of the second non-folding portion face each other, the rotatable plate is perpendicular to the first plate and directly contacts an end surface of the second plate.

2. The foldable display device of claim 1, wherein, in an un-folded mode in which the folding portion is not folded, the rotatable plate is parallel to the first plate.

3. The foldable display device of claim 2, wherein, in the un-folded mode, the rotatable plate supports the folding portion.

4. The foldable display device of claim 1, wherein, in the out-folded mode, the rotatable plate does not support a substantial portion of the folding portion.

5. The foldable display device of claim 1, wherein, in an inwardly folded mode when the folding portion is folded such that a display surface of the first non-folding portion and a display surface of the second non-folding portion face each other, the rotatable plate is parallel to the first plate.

6. The foldable display device of claim 5, wherein, in the inwardly folded mode, the rotatable plate supports a substantial portion of the folding portion.

7. The foldable display device of claim 5, wherein the folding portion includes a first region adjacent to the first non-folding portion and a second region adjacent to the second non-folding portion, and, in the inwardly folded mode, the first region is not folded and the second region is folded.

8. The foldable display device of claim 7, wherein, in the inwardly folded mode, the rotatable plate supports the first region of the folding portion.

9. The foldable display device of claim 1, wherein the foldable display module is foldable in the out-folded mode when the folding portion is folded around a first folding axis, and in an inwardly folded mode when the folding portion is folded around a second folding axis such that a display surface of the first non-folding portion and a display surface of the second non-folding portion face each other.

10. The foldable display device of claim 9, wherein a radius of curvature of the folding portion in the inwardly folded mode is less than a radius of curvature of the folding portion in the out-folded mode.

11. The foldable display device of claim 9, wherein the shortest distance from the first folding axis to the first non-folding portion is substantially the same as the shortest distance from the first folding axis to the second non-folding portion.

12. The foldable display device of claim 9, wherein the shortest distance from the second folding axis to the first non-folding portion is greater than the shortest distance from the second folding axis to the second non-folding portion.

13. The foldable display device of claim 1, wherein the third member is coupled to the first support member through a gear portion.

* * * * *